United States Patent
Kondo et al.

(10) Patent No.: US 9,467,087 B2
(45) Date of Patent: Oct. 11, 2016

(54) SWITCHING CONTROL DEVICE

(71) Applicant: DENSO CORPORATION, Kariya, Aichi-pref. (JP)

(72) Inventors: Taizo Kondo, Kariya (JP); Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 14/692,976

(22) Filed: Apr. 22, 2015

(65) Prior Publication Data

US 2015/0311851 A1  Oct. 29, 2015

(30) Foreign Application Priority Data

Apr. 23, 2014 (JP) .................................. 2014-089351

(51) Int. Cl.
| | |
|---|---|
| B25J 9/16 | (2006.01) |
| G05B 11/28 | (2006.01) |
| H02P 27/08 | (2006.01) |
| H02P 6/14 | (2016.01) |
| H02M 7/48 | (2007.01) |
| H02M 1/38 | (2007.01) |
| H02M 1/00 | (2006.01) |

(52) U.S. Cl.
CPC .............. *H02P 27/085* (2013.01); *H02M 7/48* (2013.01); *H02P 6/14* (2013.01); *H02M 2001/007* (2013.01); *H02M 2001/385* (2013.01); *H02P 2201/09* (2013.01)

(58) Field of Classification Search
CPC . H02M 2001/385; H02M 7/48; H02P 27/06; H02P 6/14; H02P 27/085
See application file for complete search history.

(56) References Cited

U.S. PATENT DOCUMENTS 8,963,479 B2 * 2/2015 Suzuki .................. H02P 27/085
                                                         318/599
2006/0250728 A1 11/2006 Hussein

FOREIGN PATENT DOCUMENTS

| JP | 2011-160570 | 8/2011 |
|---|---|---|
| WO | WO 2005/081389 | 9/2005 |

* cited by examiner

*Primary Examiner* — Bentsu Ro
*Assistant Examiner* — Zemenay Truneh
(74) *Attorney, Agent, or Firm* — Nixon & Vanderhye PC

(57) ABSTRACT

A switching control device is applied to a motor generator drive system equipped with a boost converter and an inverter. In order to avoid generation of a superimposed surge voltage, the switching control device corrects a switching timing tsw of the booster converter so that a switching timing of the booster converter is not overlapped with a switching timing of the inverter. A booster converter switching correction means corrects the switching timing tsw of the correction target to bring forward and before a start timing tpa of the switching inhibition period Pp. This makes it possible to suppress fluctuation in output of a load due to deterioration in controllability of the electric power converter, for example, suppress fluctuation in output torque of a motor generator.

15 Claims, 32 Drawing Sheets

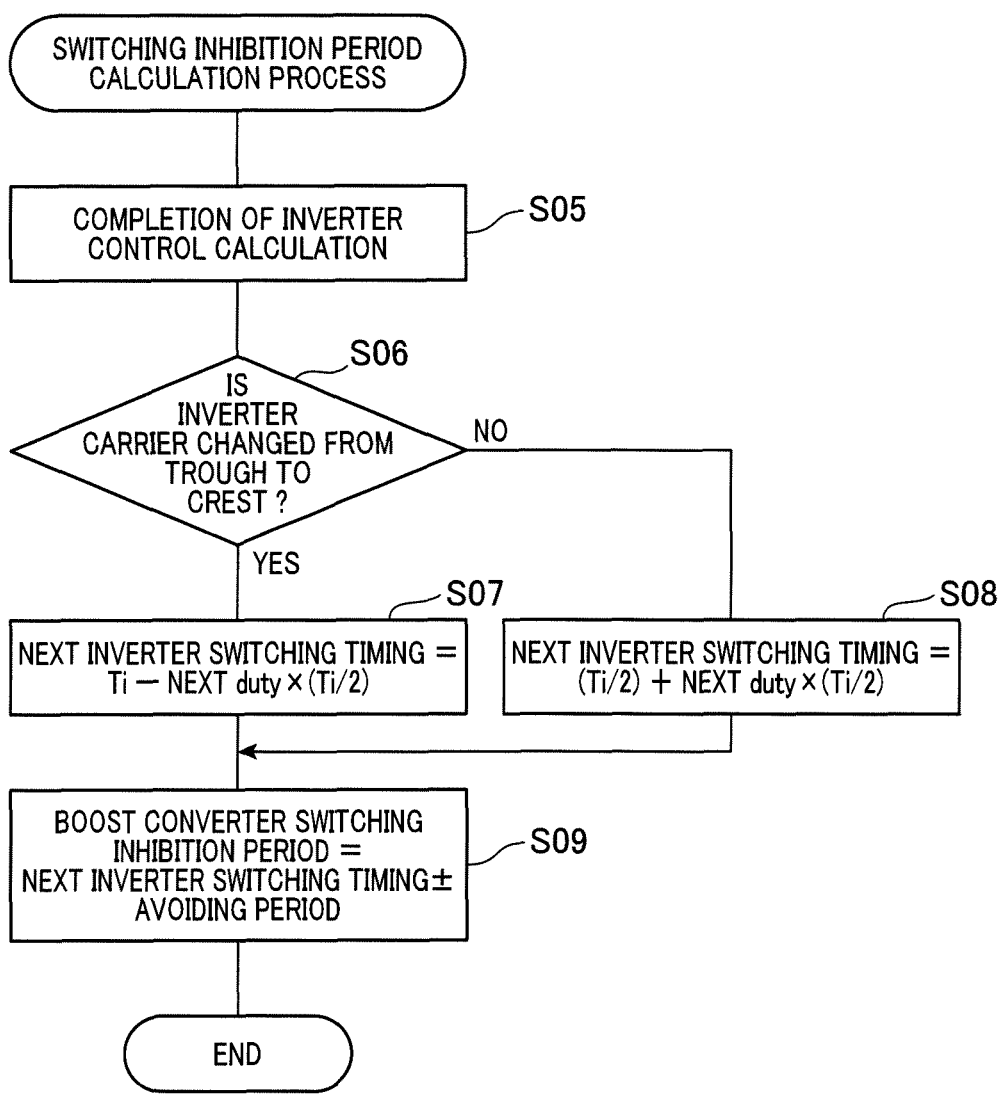

SWITCHING CONTROL DEVICE

CROSS-REFERENCE TO RELATED APPLICATION

This application is related to and claims priority from Japanese Patent Application No. 2014-89351 filed on Apr. 23, 2014, the contents of which are hereby incorporated by reference.

BACKGROUND OF THE INVENTION

1. Field of the Invention

The present invention relates to switching control devices capable of controlling operation of switching elements in an electric power converter having a direct current voltage converter and an electric power converter which converts a direct current power output from the direct current voltage converter.

2. Description of the Related Art

Conventionally, there has been known a switching control device capable of controlling operation of switching elements in an electric power converter having a direct current voltage converter and a power converter. The power converter is capable of converting a direct current power output from the direct current voltage converter. The switching control device is capable of avoiding generation of a superimposed surge voltage caused when switching timings of the switching elements are overlapped with each other.

For example, a patent document 1 (Japanese patent laid open publication No. 2011-160570) discloses a switching control device capable of delaying a switching timing of switching elements in an inverter to a completion timing of a predetermined inverter shutdown period (switching inhibition period) when a switching timing of switching elements in a boost converter as the direct current voltage converter and a switching timing of switching elements in an inverter as the power converter are overlapped with each other.

However, the switching control device disclosed by the patent document 1 has possible deterioration of controllability of the inverter due to a large delay of the switching timing in the inverter and possible fluctuation of an output torque of the motor generator, i.e. a possible increasing of fluctuation of the motor generator when successive switching operations occur in the boost converter.

It is therefore desired to provide a switching control device capable of avoiding generation of a superimposed surge voltage in a direct current voltage converter and a power converter, and suppressing fluctuation in output of a load.

SUMMARY

The switching control device according to the present invention is applied to a load drive system equipped with a direct current voltage converter and a power converter, and capable of controlling a switching timing of switching element pairs in the direct current voltage converter and the power converter.

The direct current voltage converter has a reactor and at least a switching element connected to the reactor. The reactor is capable of charging and discharging electric energy. In the direct current voltage converter, an input voltage Vi, to be supplied to the reactor from a direct current power source, is converted to an output voltage VH by turning on and off the switching element.

The electric power converter has a plurality of switching element pairs, each switching element pair consists of a switching element at a high voltage side and a switching element at a low voltage side. The switching elements pairs are alternately turned on and off to convert the direct current power output from the direct current voltage converter to an alternating current power. The alternating current power is supplied to a load.

The switching control device according to the present invention has a direct current voltage converter control circuit, a direct current voltage converter drive circuit, an electric power converter control circuit, an electric power converter drive circuit, a direct current voltage converter switching inhibition period calculation means, and a direct current voltage converter switching correction means.

The direct current voltage converter control circuit calculates a control value of the direct current voltage converter on the basis of an instruction voltage for the output voltage of the direct current voltage converter.

The direct current voltage converter drive circuit drives the switching elements of the direct current voltage converter on the basis of the control value of the direct current voltage converter calculated by the direct current voltage converter control circuit.

The electric power converter control circuit calculates a control value of the electric power converter on the basis of a requested output of the load.

The electric power converter drive circuit drives the switching element pairs of the electric power converter on the basis of the control value of the electric power converter calculated by the electric power converter control circuit.

The direct current voltage converter switching inhibition period calculation means performs a direct current voltage converter switching inhibition period calculation process of calculating a direct current converter switching inhibition period Pp. This direct current converter switching inhibition period Pp indicates a period of inhibiting the switching of the switching elements of the direct current voltage converter during a predetermined period which is in synchronization with an electric power converter switching timing, prior to this electric power converter switching timing as a switching timing of at least a pair of the switching elements forming the electric power converter.

The electric power converter switching timing indicates a switching timing on a time axis, and further indicates a switching electrical angle on an electrical angle axis when an electric rotary machine is a load, for example.

The direct current voltage converter switching correction means performs a switching timing correction process of correcting the switching timing of a correction target to a timing which is prior to a start timing of the direct current voltage converter switching inhibition period, where the direct current voltage converter switching timing (tsw) is the switching timing of the correction target when it is predicted for the direct current voltage converter switching timing as the switching timing of at least the switching element in the direct current voltage converter to be within the direct current voltage converter switching inhibition period.

A width of the switching inhibition period is determined to adequately keep a time length in which a surge voltage is attenuated without affecting each switching element on the basis of considering an estimated magnitude of a surge voltage and fluctuation in characteristics of each switching element.

The switching control device according to an exemplary embodiment of the present invention can avoid generation of a superimposed surge because of correcting the switching timing of the switching element as a correction target to a time which is out of the direct current voltage converter switching inhibition period when it is expected that the switching timing of the direct current voltage converter and the switching timing of the electric power converter are overlapped.

In addition, the present invention does not correct the switching timing of the electric power converter performed by the conventional technique of the patent document 1, but rather correct the switching timing of the direct current voltage converter. Further, the present invention does not delay the switching timing, but rather advances the switching timing.

This makes it possible to suppress fluctuation of the output of the load due to deterioration in controllability of the electric power converter. For example, the present invention suppresses fluctuation of an output torque of a motor generator.

For example, there are the following methods for the direct current voltage converter switching correction means in the switching control device according to the exemplary embodiment of the present invention to bring forward the switching timing of the correction target in the direct current voltage converter.

(a1) The direct current voltage converter switching correction means corrects a duty calculated by the direct current voltage converter control circuit when the direct current voltage converter drive circuit controls the output voltage of the direct current voltage converter on the basis of a time ratio (duty) which is a ratio of a turned on time and a turned off time regarding a switching period;

(a2) A carrier period is changed when the direct current voltage converter drive circuit further compares the time ratio and a carrier wave (carrier) and generates a drive signal.

In addition, the switching control device according to the exemplary embodiment of the present invention provides an optimal switching timing of the correction target which is a time before the start timing of the direct current voltage converter switching inhibition period. For example, the switching timing of the correction target is brought forward by considering the output voltage of the direct current voltage converter or a reactor current. This makes it possible to decrease an output voltage and the reactor current. Because the deterioration of controllability of the electric power converter needs to have a minimum correction time period, it is preferable to correct the switching timing of the correction target to approach the start timing of the direct current voltage converter switching inhibition period.

On the other hand, in a case in which the output voltage and the reactor current increase by bringing forward the switching timing of the correction target, when the output voltage and the reactor current before correction have a margin in a voltage threshold value or a current threshold value, it is preferable to correct the switching timing of the correction target to a maximum time which becomes apart from the start timing of the direct current voltage converter switching inhibition period so that the output voltage and the reactor current become equal to these threshold values.

In addition to correcting the switching timing of the correction target, it is acceptable to further correct a switching timing, before the switching timing of the correction target, in plural switching timings appearing during the switching timings from the start timing of the switching timing correction process to the switching timing of the correction target.

For example, it is possible to avoid an output rapid change due to the process of correcting the switching timing by slightly changing the time ratio of the switching element.

Or, it is possible to suppress fluctuation in output voltage by correcting the time ratio so that the time ratio before the correction process and the time ratio after the correction process have the same value during the switching period of not less than a half period.

In addition, it is better to use the following timings in order for the direct current voltage converter switching correction means to execute the switching timing correction process.

(b1) When the switching timing correction process is performed at a possible early timing, the switching timing correction process is started immediately after completion of the process of calculating the direct current voltage converter switching inhibition period.

(b2) When the switching timing correction process is executed at a possible late timing, the switching timing correction process is started so that the switching timing correction process is completed immediately before the determination of the switching timing to be supplied to the direct current voltage converter drive circuit.

Further, there are the following options regarding the timing for the direct current voltage converter switching inhibition period calculation means to start the direct current voltage converter switching inhibition period, and regarding the electric power converter switching timing to be used as a reference when the direct current voltage converter switching inhibition period is calculated.

(c1) The direct current voltage converter switching inhibition period calculation process starts at a timing when the electric power converter control circuit calculates the electric power converter switching timing, and the direct current voltage converter switching inhibition period is calculated on the basis of the electric power converter switching timing calculated by the electric power converter control circuit.

(c2) In addition to the calculation of the electric power converter switching timing by the electric power converter control circuit, the electric power converter predicted switching timing is calculated for the next electric power converter switching timing, and the direct current voltage converter switching inhibition period is calculated on the basis of the electric power converter predicted switching timing.

(c3) The direct current voltage converter switching inhibition period calculation process is started at an updated timing of control information to be used for controlling the electric power converter.

It is possible to use a combination of (c2) and (c3).

When the load drive system in each exemplary embodiment of the present invention drives an electric rotary machine as the load, it is possible to define a switching electrical angle on an electrical angle axis of the electric rotary machine as the electric power converter switching timing, instead of using the switching timing on the time axis. In this case, it is possible for the direct current voltage converter switching inhibition period calculation means to calculate the direct current voltage converter switching inhibition period on the basis of the switching electrical angle calculated by the electric power converter control circuit or a predicted switching electrical angle estimated by the electric power converter control circuit.

By the way, in the operation states of the direct current voltage converter and the electric power converter, it is not always possible for the switching timing correction process to calculate the correction timing. For example, there is a case in which it is impossible to calculate the correction timing and the calculated correction timing is within the switching inhibition period.

When it is difficult for the switching timing correction process to calculate the correction timing of the switching timing of the correction target, it is acceptable to correct the electric power converter switching timing to bring it forward so that the switching timing of the correction target becomes out of the direct current voltage converter switching inhibition period.

That is, when it is difficult to correct the switching timing of the direct current voltage converter, as a main concept of the present invention, it is possible to avoid generation of a superimposed surge voltage by exceptionally correcting the switching timing of the electric power converter.

BRIEF DESCRIPTION OF THE DRAWINGS

FIG. 6 is a view showing a flow chart of the boost converter switching inhibition period calculation process shown in FIG. 5A and FIG. 5B.

DETAILED DESCRIPTION OF THE PREFERRED EMBODIMENTS

Figure 1:
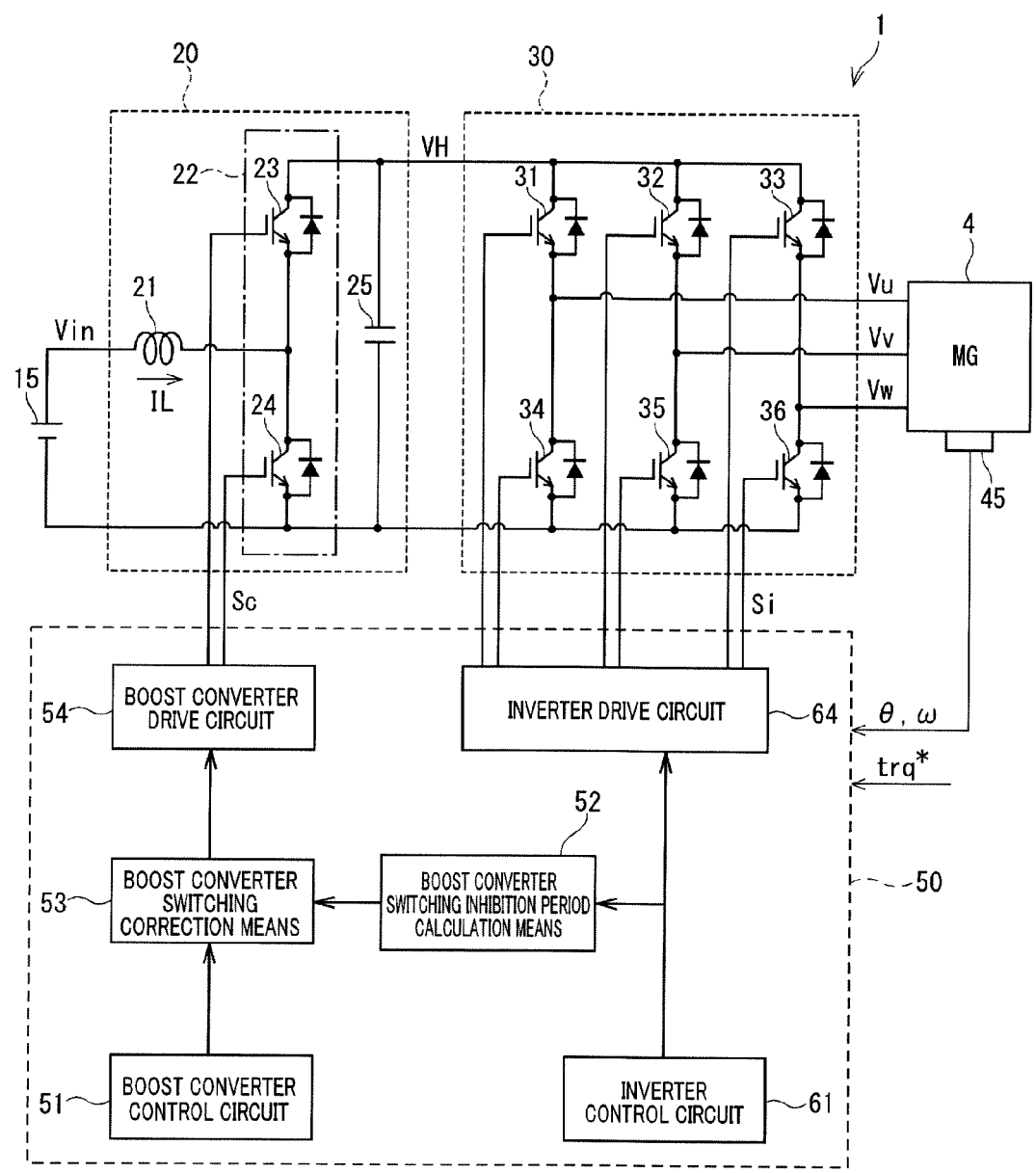
FIG. 1 is a view showing an overall structure of a motor generator drive system to which the switching control device according to a first to eighth exemplary embodiments of the present invention is applied.

Hereinafter, various embodiments of the present invention will be described with reference to the accompanying drawings. In the following description of the various embodiments, like reference characters or numerals designate like or equivalent component parts throughout the several diagrams.

The switching control device according to the exemplary embodiments of the present invention is applied to a motor generator drive system capable of driving a motor generator as a main engine of a hybrid vehicle and an electric vehicle, for example.

The motor generator drive system has a boost converter and an inverter. The boost converter boosts a voltage of a battery as an electric power source. The inverter converts a direct current power supplied from the boost converter to an alternating current power and supplies the converted alternating current power to the motor generator.

The boost converter and the inverter are driven by turning on and off switching elements therein. The switching control device according to the present invention is capable of correcting a switching timing of the switching elements in the boost converter to be brought forward in order to avoid generation of a superimposed surge. The superimposed surge will be explained later.

The following first to eighth exemplary embodiments will explain the correction of the switching timing of the boost converter to bring forward it. The ninth exemplary embodiment will explain the correction of the switching timing of the switching elements in the inverter to bring it forward which is an exceptional case of the present invention.

The word present exemplary embodiment indicates the common matters through the first to ninth exemplary embodiments.

Exemplary Embodiments of Correcting the Switching Timing of the Boost Converter

A description will be give of a common structure and actions of the switching control device 60 according to the first to eighth exemplary embodiments with reference to FIG. 1 to FIG. 4.

As shown in FIG. 1, the motor generator drive system 1 as the load drive system has a battery 15 as the direct current power source, a boost converter 20 as the direct current voltage converter, an inverter 30 as the electric power converter, a motor generator 4 (which is designated by reference character MG shown in drawings) as the load, a switching control device 50, etc.

A description will now be given of the structure of the system excepting the boost converter 20 and the inverter 30.

The battery 15 is a direct current power source consisting of a rechargeable battery device such as a nickel metal hydride battery, or a lithium ion battery, for example. It is possible to use an electric double-layer capacitor, etc. as the direct current power source.

The motor generator 4 is a three phase alternating current electric motor of a permanent magnet synchronous type, for example. The motor generator 4 is mounted on a hybrid vehicle and an electric vehicle. The motor generator 4 has a function of operating as an electric motor capable of generating a drive torque and transmitting the generated drive torque to drive wheels through a transmission while a current is supplied to the motor generator 4. The motor generator 4 further has a function of performing a regenerative operation as an electric generator by receiving a drive torque transmitted from the internal combustion engine and the drive wheels.

A rotation angle sensor 45 is mounted close to a rotor of the motor generator 4 and has a resolver or a rotary encoder, for example. The rotation angle sensor 45 detects an electrical angle θ. The switching control device 50 receives the electrical angle θ detected by the rotation angle sensor 45, and uses it in a d-q conversion, etc. of a current vector torque control. Further, the rotation angle sensor 45 performs a time differential of the electrical angle θ, and calculates an electric angular velocity ω. It is acceptable for an inside section of the switching control device or an external section to calculate the electric angular velocity ω.

Next, a description will be given of a structure of the boost converter 20. The boost converter 20 is equipped with a reactor 21, a booster drive section 22 and a smoothing capacitor 25, etc.

The reactor 21 has an inductance L, and generates an induced voltage due to a change of a current IL and stores the generated electric power.

The booster drive section 22 consists of a switching element 23 at a high voltage side and a switching element 24 at a low voltage side. The switching element 23 at a high voltage side is connected between an output terminal of the reactor 21 and a high voltage line of the inverter 30. The switching element 24 at a low voltage side is connected between the output terminal of the reactor 21 and a negative electrode of the battery 15. For example, the switching element 23 at a high voltage side is also referred to as the upper-arm switching element 23, and the switching element 24 at a low voltage side is also referred to as the lower-arm switching element 24.

The upper-arm switching element 23 and the lower-arm switching element 24 are alternately or complementary turned on and off on the basis of a converter drive signal Sc (see FIG. 3) transmitted from a boost converter drive circuit 54.

The booster drive section 22 used in the present exemplary embodiment previously described forms pairs of the switching elements. However, it is acceptable for other exemplary embodiments to have the booster drive section 22 by using one or more switching element which do not form any pair.

The reactor current IL flows in the reactor 21 and electric energy is charged in the reactor 21 when the switching element 23 at a high voltage side is turned off and the switching element 24 at a low voltage side is turned on.

The reactor 21 discharges the electric energy stored therein when the switching element 23 at a high voltage side is turned on and the switching element 24 at a low voltage side is turned off. The induced voltage is superimposed on the input voltage Vin of the battery. The smoothing capacitor 25 is charged by the boosted voltage VH.

The inverter 30 has switching element pairs of three phases (U phase, V phase and W phase) consisting of switching elements 31, 32, 33 at a high voltage side and switching element 34, 35 and 36 at a low voltage side. These switching elements 31, 32, 33 at a high voltage side and switching element 34, 35 and 36 at a low voltage side are connected together to form a bridge connection. Like the boost converter 20, the switching elements 31, 32, 33 at a high voltage side are also referred to as the upper-arm switching elements, and the switching element 34, 35 and 36 at a low voltage side are referred to as the lower-arm switching elements. The upper-arm switching elements and the lower-arm switching elements correspond the switching element pairs used in the claims.

The upper-arm and lower-arm switching elements 31 to 36 in each phase are alternately turned on and off on the basis of the inverter drive signals Si (see FIG. 3) transmitted from an inverter drive circuit 64.

The inverter 30 receives the direct current power of the output voltage VH transmitted from the boost converter 20. The boost converter 20 boosts the battery input voltage Vin and outputs the output voltage VH. The upper-arm switching elements and the lower-arm switching elements in each phase are alternately turned on and off to convert the direct current power VH to a three phase alternating current power Vu, Vv and Vw. The inverter 30 outputs the three phase alternating current power Vu, Vv and Vw to the motor generator 4.

Next, a description will now be given of the structure of the switching control device 50 with reference to FIG. 1 and FIG. 2.

The switching control device 50 consists of a microcomputer, etc. The switching control device 50 is equipped with a CPU, a ROM, an I/O and bus lines. Through the bus lines the CPU, the ROM and the I/O are connected together. The switching control device 50 executes software processes by executing programs stored in the memory in advance. The switching control device 50 performs a hardware control process realized by dedicated electronic circuits.

The switching control device 50 receives an instruction torque trq*, an electrical angle θ, and an electric angular velocity ω of the motor generator 4 transmitted from the upper-hierarchy vehicle control circuit, etc. It is acceptable for the switching control device 50 to calculate the electric angular velocity ω [rad/s] and converts the electric angular velocity ω [rad/s] to a rotation speed N [rpm].

The switching control device 50 is equipped with a boost converter control circuit 51 and the boost converter drive circuit 54 for the boost converter 20, and an inverter control circuit 61 and the inverter drive circuit 64 for the inverter 30.

The boost converter control circuit 51 and the boost converter drive circuit 54 correspond to the direct current converter control circuit and the direct current converter drive circuit used in the claims, respectively.

The switching control device 50 is equipped with a boost converter switching inhibition period calculation means 52 as the direct current voltage converter switching inhibition period calculation means, and a boost converter switching correction means 53 as the direct current voltage converter switching correction means.

The boost converter control circuit 51 calculates a control value of the boost converter 20 on the basis of the instruction voltage VHcom correlated to the output voltage VH of the boost converter 20. The boost converter drive circuit 54 generates a drive signal Sc on the basis of the control value for the boost converter 20 calculated by the boost converter control circuit 51, and instructs the upper-arm switching elements 23 and 24 in the booster drive section 22 to be alternately turned on and off.

The boost converter control circuit 51 used on the present exemplary embodiment calculates a duty (time ratio) as a turned on/off time ratio correlated to the switching period as the control value of the boost converter 20. The boost converter drive circuit 54 compares the duty with a triangle wave carrier to generate a PWM signal. Hereinafter, the description uses the duty as an instruction value of the turned-on time ratio (on-duty) correlated to the switching period of the switching element at a high voltage side. Without regard to a dead time, the turned-on duty of the switching element 24 at a low voltage side is equal to a turned-off duty of the switching element 23 at a high voltage side, and corresponds to 100% duty, i.e. the duty of 1.

In general, the duty has a percentage unit [%]. The description uses a non-dimensional duty within a range of not less than 0 and not more than 1.

The inverter control circuit 61 calculates a control value for the inverter 30 on the basis of the instruction torque trq* for the motor generator 4. The inverter drive circuit 64 generates the drive signal Si on the basis of the control value for the inverter 30 calculated by the inverter control circuit 61, and instructs the upper-arm and lower-arm switching elements 31 to 36 in each phase to be alternately turned on and off.

The inverter control circuit 61 used in the present exemplary embodiment calculates each phase duty on the basis of each phase voltage instruction value as the control value for the inverter 30. The inverter drive circuit 64 compares each phase duty with the triangle wave carrier to generate a PWM signal.

Hereinafter, the description uses the duty as an on-duty instruction value of the switching elements at a high voltage side in each phase. Without regard to a dead time, the turned-on duty of the switching element 24 at a low voltage side in each phase is equal to the duty of 1, i.e. 100% duty which corresponds to the duty of the switching elements at a high voltage side. Accordingly, the duty indicates the turned-on duty instruction value of the switching elements at a high voltage side, like the boost converter 20 and the inverter 30. In particular, the duty of the boost converter 20 is referred to as the CNV-duty or the duty simple, and the duty in each phase of the inverter 30 is referred to as the INV-duty or the duty.

Figure 2:
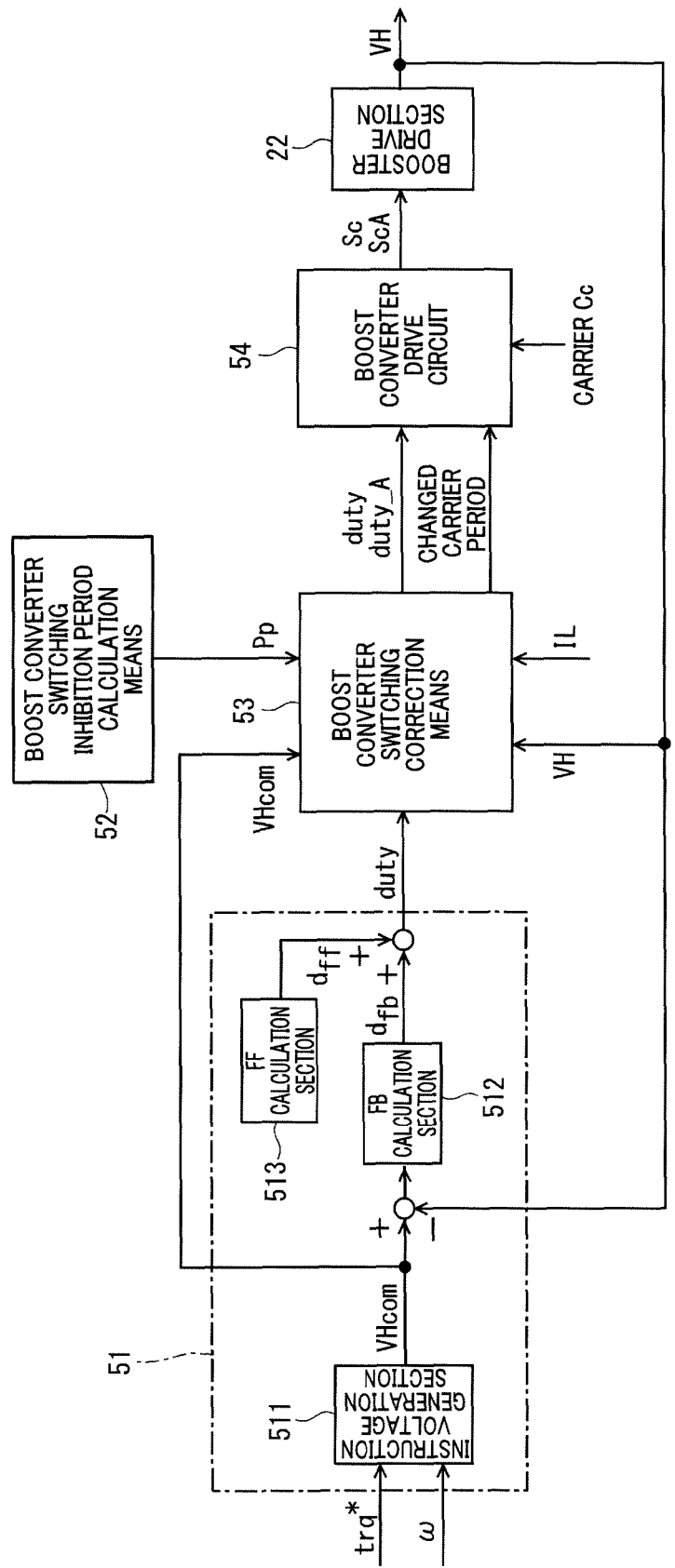
FIG. 2 is a schematic block diagram showing a control structure of a boost converter switching timing of a boost converter in the switching control device shown in FIG. 1.

A general structure of the boost converter control circuit 51 is shown at a left side in FIG. 2. The boost converter control circuit 51 has an instruction voltage generation section 511, a feedback calculation section 512, and a feed-forward calculation section 513.

The instruction voltage generation section 511 calculates the instruction voltage Vcom on the basis of the instruction torque trq* and the electric angular velocity ω. The feedback calculation section 512 performs a PI calculation to obtain a feedback term dfb in the duty so as to converge a difference between the instruction voltage Vcom and the output voltage VH to zero. The feed-forward calculation section 513 calculates a feedforward term dff in the duty. The boost converter control circuit 51 outputs the duty as an addition of the feedback term dfb and the feedforward term dff.

The inverter control circuit 61 has a known structure using a current feedback control or a torque feedback control. The current feedback control performs the control to converge a current difference between the instruction current and an actual current on the basis of a dq axis current vector to zero. The torque feedback control performs a control to converge a torque difference between the instruction torque and an actual torque. These controls output the duty of each phase which has been calculated on the basis of the phase voltage instruction value in each phase. Because the structure of the inverter control circuit 61 is known, the detailed explanation of the inverter control circuit 61 is omitted.

Next, a description will now be given of the operation of the boost converter switching inhibition period calculation means 52 and the boost converter switching correction means 53 with reference to the timing chart shown in FIG. 3.

Figure 3:
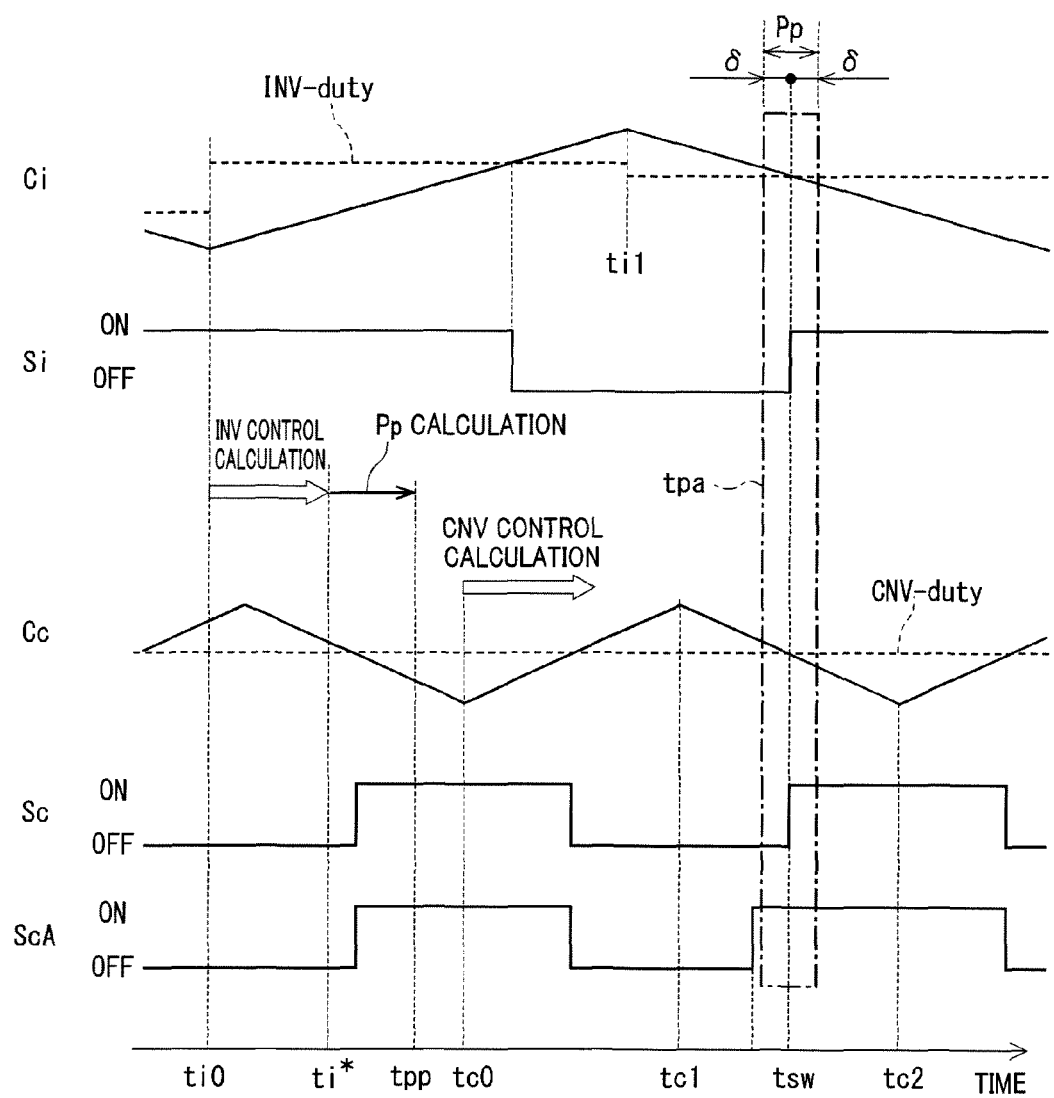
FIG. 3 is a view showing a timing chart explaining a boost converter switching inhibition period.

The timing chart shown in FIG. 3 shows the inverter carrier signal Ci, the inverter drive signal Si, the converter carrier Cc and the converter drive signal Sc, respectively, from the upper side of FIG. 3. The subscript i indicates the inverter, c indicates the boost converter. The boost converter will also be called to as the converter simply. In addition, the boost converter switching timing indicates the switching timing of the switching elements in the boost converter 20. The inverter switching timing indicates the switching timing of the switching elements in a phase of the inverter 30.

The case in which the drive signals Si and Sc have an on state indicates that the switching element at a high voltage side is turned on and the switching element at a low voltage side is turned off. The case in which the drive signals Si and Sc has an off state indicates that the switching element at a high voltage side is turned off and the switching element at a low voltage side is turned on. That is, without regard to a dead time, the drive signals Si and Sc represent the operation state of the switching element pair.

In the timing charts explained later, the drive signals Si and Sc are in the on-state when the duty exceeds the carrier Ci and Cc. The drive signals Si and Sc become the off-state when the duty becomes less than the carrier Ci and Cc. Accordingly, the drive signals Si and Sc are in the on-state during a period in which the carriers Ci and Cc drop from the crest to the trough, and the drive signals Si and Sc become the off-state during a period in which the carriers Ci and Cc rise from the trough to the crest. For example, the drive signal Sc for the boost converter 20 rises during the timing tc1 and the timing tc2.

The timing charts explained later have the same condition previously described.

As shown in FIG. 3, the inverter control circuit 61 and the boost converter control circuit 51 acquire new control information every crest and trough of each of the carriers Ci and Cc, perform the control calculation to determine a next duty. In FIG. 3, the inverter control calculation starts at the trough timing ti0 of the inverter carrier Ci, and the converter control calculation starts at the trough timing tc0 of the converter carrier Cc. The inverter drive circuit 64 and the boost converter drive circuit 54 input the next duty which has been predetermined, and the next duty is used at the next trough of each carriers Ci and Cc. The inverter control circuit 61 and the boost converter control circuit 51 operate independently to each other.

By the way, a surge voltage (V=−L×dI/dt) is generated during the switching operation of the switching elements because a current rapidly increases or decreases. When the switching elements perform the switching operation at switching timings closed to each other, the surge voltages are superimposed with each other to generate the superimposed surge having a large voltage or superimposed surge voltage. When the superimposed surge exceeds a withstand voltage of each switching element, malfunction of the switching element is possible.

In a plurality of switching timings shown in FIG. 3, the rising timing of the inverter drive signal Si and the falling timing of the converter drive signal Sc are overlapped together at the switching timing tsw. A period including an avoiding period δ before and after the switching timing tsw indicates the boost converter switching inhibition period (or, referred to with the switching inhibition period in short) which is designated by a frame of a long dashed short dashed line.

The avoiding period δ has been determined to maintain an adequate time period in which the surge voltage is attenuated to a value which does not affect the operation of each switching element while considering a magnitude of a predicted surge voltage and characteristic fluctuation of each switching element. When it is predicted that the switching timing of the boost converter becomes within the switching inhibition period Pp, it is request to correct the switching timing tsw in advance to become out of the switching inhibition period Pp.

There have been known a conventional technique (for example, Japanese patent No. 4428386) and another conventional technique (for example, patent document 1: Japanese patent laid open publication No. 2011-160570). The former conventional technique is capable of avoiding the switching timings of the switching elements in each phase of an inverter from being superimposed together. The latter conventional technique is capable of avoiding the switching timings of the switching elements in a boost converter and an inverter from being overlapped together.

The boost converter switching inhibition period calculation means 52 used in the switching control device 50 according to the first to eighth exemplary embodiment calculates the switching inhibition period Pp before calculation of the switching timings of the switching element pair in each phase of the inverter 30. It is inhibited to perform the switching process of the switching elements 23 and 24 in the boost converter 20 during a predetermined period which is in synchronization with the switching inhibition period Pp.

For example, in the first exemplary embodiment which will be explained later, when a next INV-duty is calculated at a trough timing of the inverter carrier Ci, the switching inhibition period Pp is calculated from a control calculation completion timing ti* on the basis of the determined INV-duty.

Further, when it is predicted that the switching timing of the boost converter 20 is within the switching inhibition period Pp, the boost converter switching correction means 53 performs the correction process by using the switching timing of the boost converter 20 as the switching timing tsw of the correction target.

However, the switching control device 50 according to each of the first to eighth exemplary embodiment of the present invention has the following improved features which are different from the conventional technique according to the patent document 1.

The conventional technique disclosed in the patent document 1 corrects the switching timing of the inverter to delay the switching timing to a completion timing of a predetermined switching inhibition period. Accordingly, the successive switching process by the boost converter deteriorates the controllability of the inverter when the switching timing of the inverter becomes greatly delayed. This increases fluctuation in output torque of the motor generator 4.

On the other hand, the boost converter switching correction means 53 in the switching control device 50 according to each of the first to eighth exemplary embodiment of the present invention has the feature which corrects the switching timing tsw of the boost converter to be brought forward so that the switching timing tsw becomes before the start timing tpa of the switching inhibition period.

That is, the switching control device 50 according to each of the first to eighth exemplary embodiment of the present invention does not correct the switching timing of the switching elements in the inverter 30, like the conventional technique according to the patent document 1, but corrects the switching timing of the switching elements in the boost converter 20. Further, the switching control device 50 does not delay the switching timing, but corrects the switching timing to advance, i.e. be brought forward. This makes it possible to suppress torque fluctuation of the motor generator caused by deterioration in the controllability of the inverter.

In addition, as shown at the right side in FIG. 2, the boost converter switching correction means 53 receives various information such as the instruction voltage VHcom, the output voltage VH, the reactor current IL, etc. in addition to the switching inhibition period Pp transmitted from the boost converter switching inhibition period calculation means 52. The boost converter switching correction means 53 corrects the switching timing of the switching elements of the boost converter by the following two methods of:

(d1) correcting a duty outputted from the boost converter control circuit 51; and (d2) changing a period of the converter carrier Cc.

In the method of correcting the duty (this case corresponds to the fourth to sixth exemplary embodiments which will be explained later), there is a possible case in which the boost converter switching correction means 53 outputs the previous duty before correction to the boost converter drive circuit 54, and there is another possible case in which the boost converter switching correction means 53 outputs the duty after correction to the boost converter drive circuit 54. The boost converter drive circuit 54 compares the duty (duty_A) with the carrier Cc, and outputs the drive signal Sc to the booster drive section 22.

Figure 4:
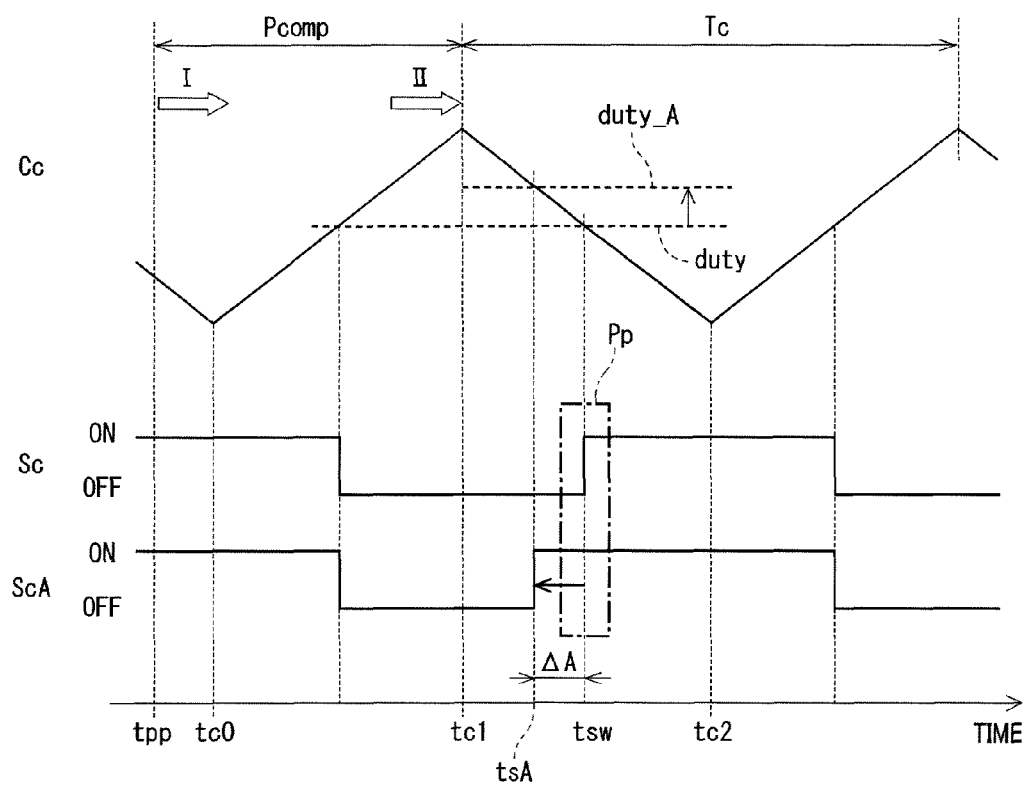
FIG. 4 is a view showing a timing chart explaining a correction of the boost converter switching timing.

A description will now be given of the correction process of the switching timing of the boost converter on the basis of the correction of the duty with reference to FIG. 4. FIG. 4 is a view showing a timing chart of the carrier Cc and the drive signal Sc for the boost converter 20 which have been shown in FIG. 3.

During the correction process period Pcomp shown in FIG. 4, it is predicted that a rising timing of the next drive signal Sc becomes within the switching inhibition period Pp, and this rising timing becomes the correction target.

It is possible to change the switching timing tsw to the timing tsA before the switching inhibition period Pp by increasing the duty before the correction to the duty_A. The corrected drive signal will be referred to as the drive signal ScA, and the correction time will be referred to as the correction time ΔA. The correction time ΔA has a negative value because it is obtained by subtracting a later time from a before time on a time axis.

A description will now be given of the explanation of the correction process start timing tc* with reference to FIG. 4 before the explanation of the switching timing correction process.

It is possible to perform the switching timing correction process during the correction process period Pcomp counted from the timing tpp, at which the switching inhibition period Pp is updated, to the return timing tc1 of the carrier Cc immediately before the switching timing tsw of the correction target. In other words, it is possible to perform the switching timing correction process at any timing during the correction process period Pcomp.

For example, in the case designated by the arrow I, it is possible to perform the switching timing correction process early enough by starting the switching timing correction process immediately after the timing tpp at which the switching inhibition period Pp is updated.

Further, in the case designated by the arrow II, it is possible to output the new information by performing the switching timing correction process at a delayed timing as delay as possible so that the process is completed immediately before the timing tc1 at which the corrected switching timing tsA is set for the boost converter drive circuit 54.

On the other hand, when the period Tc of the converter carrier Cc is changed (this case corresponds to the seventh and eighth exemplary embodiments which will be explained later), the boost converter switching correction means 53 outputs the changed carrier period to the boost converter drive circuit 54. The switching timing of the switching elements of the boost converter is corrected by comparing the duty transmitted from the boost converter control circuit 51 with the changed carrier period Cc.

A description will now be given of the switching inhibition period calculation process performed by the boost converter switching inhibition period calculation means 52 and the switching timing correction process performed by the boost converter switching correction means 53 in the switching control device 50 according to the first to eighth exemplary embodiments.

The first to third exemplary embodiments correspond to the switching inhibition period calculation process. The fourth to eighth exemplary embodiments correspond to the switching timing correction process.

Switching Inhibition Period Calculation Process

First Exemplary Embodiment

A description will be given of the boost converter switching inhibition period calculation process performed by the switching control device according to the first exemplary embodiment of the present invention with reference to FIG. 5 and FIG. 6. FIG. 5 shows a timing chart and FIG. 6 shows a flow chart.

As shown in FIG. 5, the inverter control circuit 61 starts the inverter control calculation at a timing t10 and completes it at a timing ti*. This inverter control calculation determines the next inverter duty.

The inverter control circuit 61 compares the inverter duty with the inverter carrier Ci and calculates a next inverter switching timing tsw during a period counted from a timing ti1 to a timing ti2. The timing ti1 is a return timing as a crest or a trough of the next inverter carrier Ci at the completion timing ti* of the control calculation, and the timing ti2 is a next return timing. The calculation equation calculates the time period counted from the control calculation reference timing ti0 to the next inverter switching timing tsw. This calculation equation is selected based on the condition whether or not the inverter carrier Ci rises from the trough toward the crest or from the crest toward the trough.

Figure 5A:
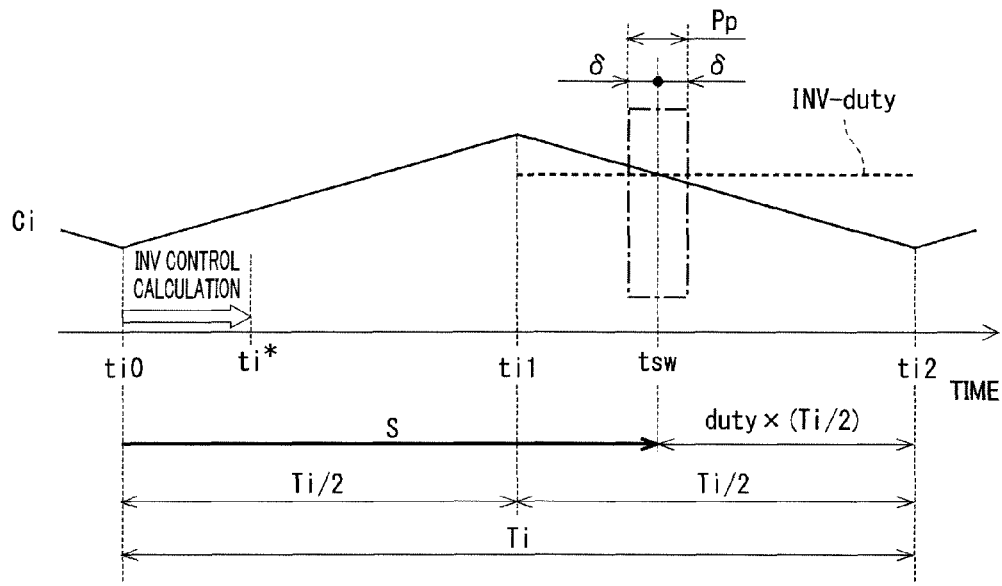
FIG. 5A and FIG. 5B are views showing timing charts of a boost converter switching inhibition period calculation process performed by the switching control device according to the first exemplary embodiment of the present invention.

As shown in FIG. 5A, when the carries Ci has the trough at the control calculation reference timing ti0 and the crest at the timing ti1, it is possible to calculate the time length S until the next inverter switching timing tsw by the following equation (1.1).

$$S = Ti - \text{Next duty} \times (Ti/2) \qquad (1.1).$$

Figure 5B:
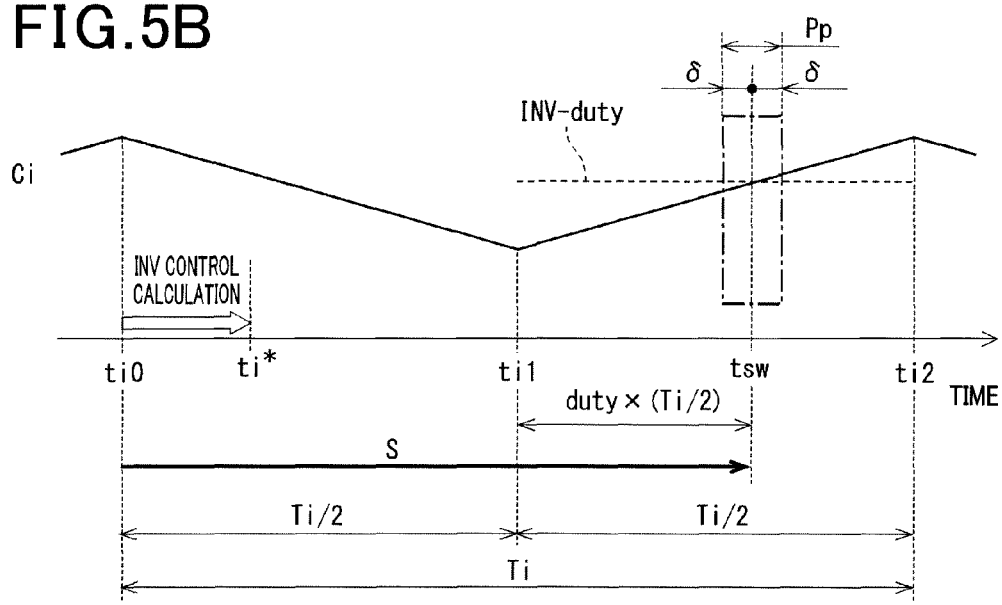

As shown in FIG. 5B, when the carries Ci has the crest at the control calculation reference timing ti0 and the trough at the timing ti1, it is possible to calculate the time length S until the next inverter switching timing tsw by the following equation (1.2).

$$S = (Ti/2) + \text{Next duty} \times (Ti/2) \qquad (1.2).$$

After the next inverter switching timing tsw is calculated, the boost converter switching inhibition period calculation means 52 starts to perform the switching inhibition period calculation process.

Next, a description will be given of the flow chart shown in FIG. 6. Reference character S used in the flow chart indicates a step.

In step S05, the inverter control calculation process is completed at the control calculation completion timing ti*.

In step S06, the change direction of the inverter carrier Ci is detected at the control calculation completion timing ti*. When the detection result indicates that the inverter carrier Ci is changed from the trough toward the crest at the control calculation completion timing ti* (S06: YES), the time length S is calculated by using the equation (1.1) in step S07. On the other hand, when the detection result indicates that the inverter carrier Ci is changed from the crest toward the trough at the control calculation completion timing ti* (S06: NO), the time length S is calculated by using the equation (1.2) in step S08.

In step S09, the addition or subtraction of the next inverter switching timing tsw and the avoiding period δ is performed in order to calculate the boost converter switching inhibition period Pp.

The first exemplary embodiment as previously described starts the switching inhibition period calculation process when the inverter control circuit 61 calculates the inverter switching timing, and calculates the switching inhibition period Pp on the basis of the calculated inverter switching timing. That is, because of calculating the switching inhibition period Pp on the basis of the determined information, it is possible to increase the calculation accuracy of the boost converter switching inhibition period Pp.

Second Exemplary Embodiment

Figure 7:
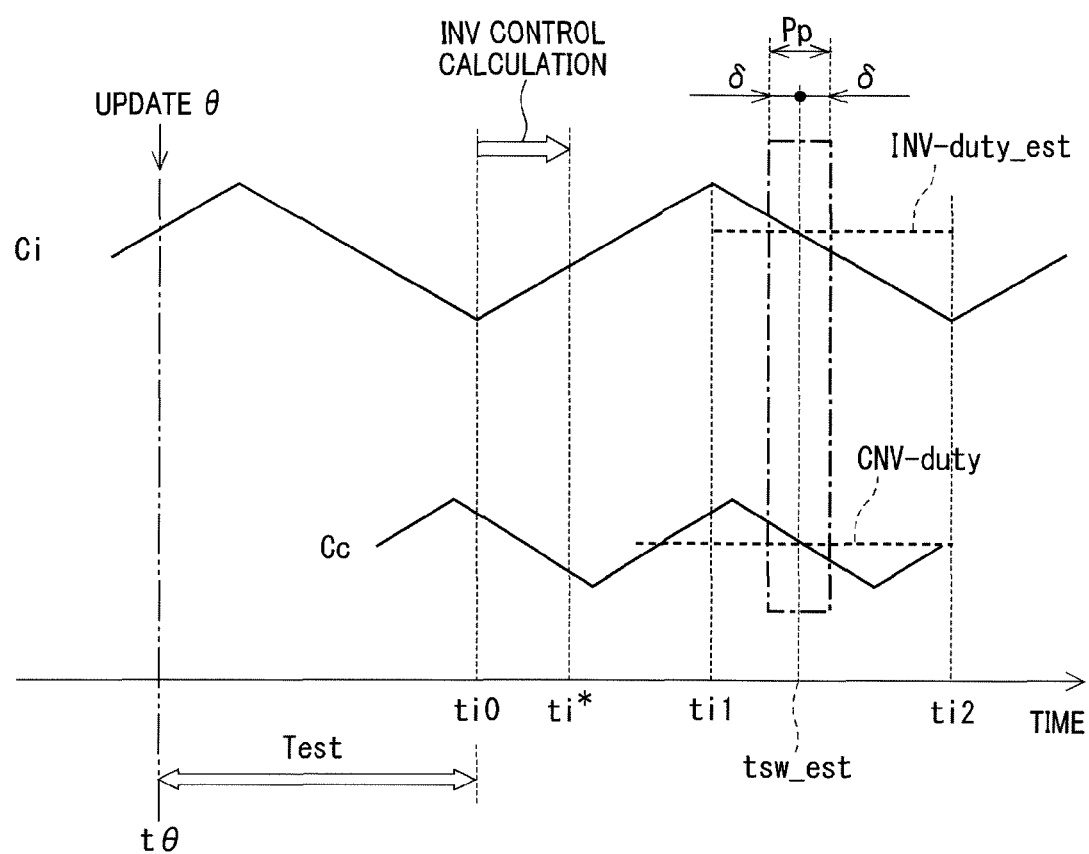
FIG. 7 is a view showing a timing chart of the boost converter switching inhibition period calculation process performed by the switching control device according to the second exemplary embodiment of the present invention.
Figure 8:
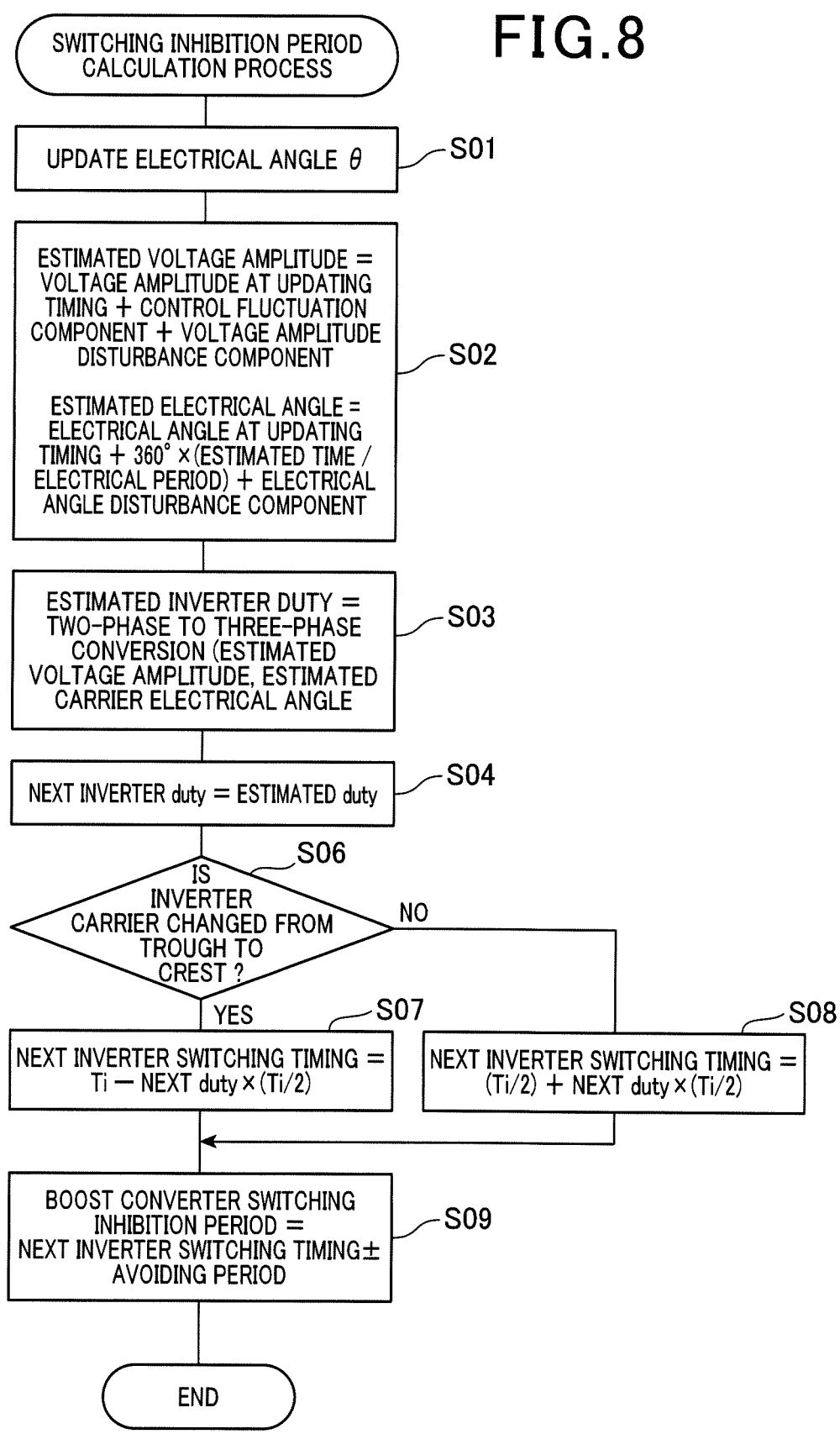
FIG. 8 is a view showing a flow chart of the boost converter switching inhibition period calculation process shown in FIG. 7.

A description will be given of the boost converter switching inhibition period calculation period according to the second exemplary embodiment of the present invention with reference to FIG. 7 and FIG. 8. FIG. 7 shows a timing chart and FIG. 8 shows a flow chart.

In the second exemplary embodiment, the switching inhibition period calculation process is started at the timing when the electrical angle θ is updated, which is control information to be used for the inverter control calculation. The boost converter switching inhibition period calculation means 52 predicts a next inverter switching timing by the switching inhibition period calculation process, and calculates the boost converter switching inhibition period Pp on the basis of the next inverter predicted switching timing.

As shown in FIG. 7, the electrical angle θ detected by the rotation angle sensor 45 is updated at the updating timing t0. The information regarding the electrical angle θ is used as the control information of the inverter control circuit 61 by the inverter control calculation. Like FIG. 5A, FIG. 5B, the inverter control calculation starts at the control calculation reference timing ti0, and completes at the completion timing ti*, and the next inverter duty is calculated.

In addition to the inverter control calculation performed by the inverter control circuit 61, the boost converter switching inhibition period calculation means 52 predicts a next inverter duty (INV-duty_est) independently on the basis of the information regarding the electrical angle θ after the updating timing t0. Here, the estimated time Test is a time length counted from the updating timing t0 to the control calculation reference timing ti0.

The boost converter switching inhibition period Pp is calculated by using the next inverter predicted switching timing tsw_est as a reference value obtained on the basis of the inverter carrier Cc and the estimated duty (INV-duty_est).

A description will be given of the operation shown in FIG. 8.

In step S01, the switching inhibition period calculation process starts to operate at the updating timing t0 when the electrical angle θ is updated.

In step S02, an estimated voltage amplitude and an estimated electrical angle at the control calculation reference timing ti0 are calculated by using the equations (2.1) and (2.2). In this case, a control fluctuation component, a voltage amplitude disturbance component and an electrical angle disturbance component are calculated in advance. In addition, it is possible to calculate an electric period on the basis of the rotation speed and the number of pole pairs of the motor generator 4.

Estimated voltage amplitude=voltage amplitude at updating timing+control fluctuation component+ voltage amplitude disturbance component (2.1).

Estimated electrical angle=electrical angle at updating timing+360°×(estimated time $T$set/electric period)+electrical angle disturbance component (2.2).

In step S03, the estimated inverter duty of each phase is calculated by performing a known two-phase to three-phase conversion (dq inverse transformation) on the basis of the estimated voltage amplitude and the estimated electrical angle.

In step S04, the estimated inverter duty of each phase is set as the next inverter duty of each phase. In step S06 to step S09, the boost converter switching inhibition period Pp is calculated on the basis of the next inverter prediction switching timing tsw_est. The calculation flow is the same of the calculation flow shown in FIG. 6 according to the first exemplary embodiment.

As previously described, in the second exemplary embodiment, the boost converter switching inhibition period calculation means 52 estimates the inverter duty on the basis of the updated information of the electrical angle θ, which is performed independently from the inverter control calculation performed by the inverter control circuit 61. Further, the boost converter switching inhibition period Pp is calculated on the basis of the estimated inverter duty. Accordingly, after the completion of the inverter control calculation, it is possible to calculate the boost converter switching inhibition period Pp at an early timing, rather than the first exemplary embodiment which performs the switching inhibition period calculation process on the basis of the determined inverter duty after the completion of the inverter control calculation.

Although FIG. 7 shows the case in which the process of estimating the inverter duty is performed before the control calculation reference timing ti0, the concept of the present invention is not limited by this method. That is, it is also acceptable to perform the process of estimating the inverter duty parallel to the inverter control calculation, i.e. during the inverter control calculation performed by the inverter control circuit 61 after the control calculation reference timing ti0.

In addition, the following two processes can be performed independently:

To start the switching inhibition period calculation process at the timing when the electrical angle θ as the inverter control information is updated; and To calculate the boost converter switching inhibition period Pp on the basis of the predicted next inverter switching timing.

Accordingly, it is acceptable to perform one of these processes.

Third Exemplary Embodiment

Figure 9:
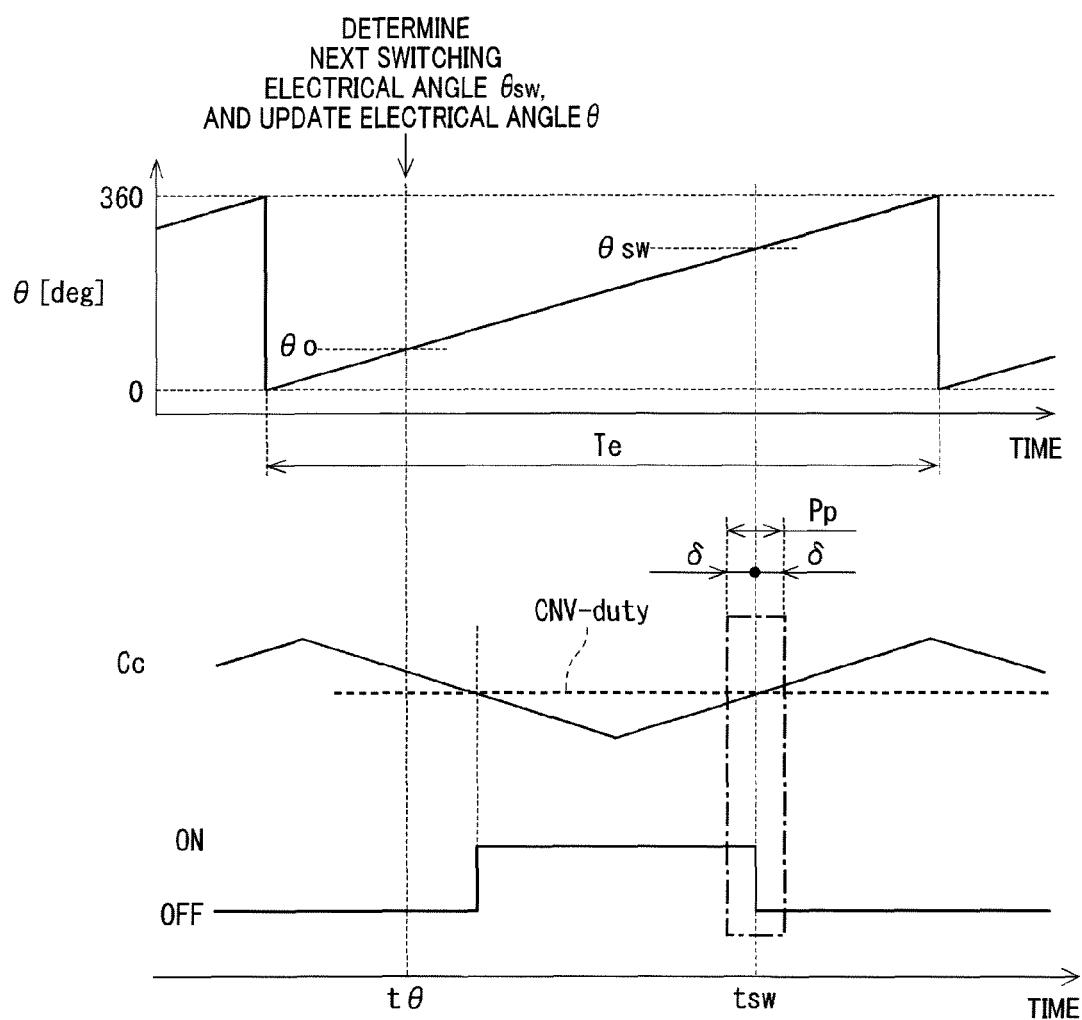
FIG. 9 is a view showing a timing chart of the boost converter switching inhibition period calculation process performed by the switching control device according to the third exemplary embodiment of the present invention.
Figure 10:
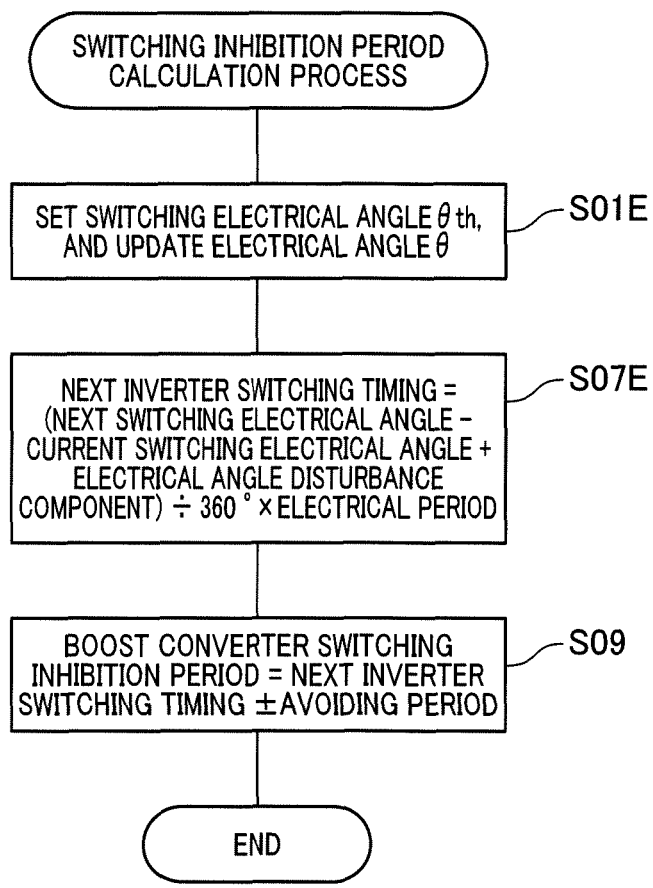
FIG. 10 is a view showing a flow chart of the boost converter switching inhibition period calculation process shown in FIG. 9.

A description will be given of the switching control device according to the third exemplary embodiment of the present invention with reference to FIG. 9 and FIG. 10. FIG. 9 shows timing charts and FIG. 10 show a flow chart. The first and second exemplary embodiments use the inverter switching timing on the time (t) axis. On the other hand, the third exemplary embodiment uses a switching electrical angle on the electrical angle (θ) axis as the inverter switching timing when the load to be controlled by the inverter 30 is an electric rotary machine.

That is, the inverter switching timing used by each exemplary embodiment in the description indicates a switching timing on the time axis as a narrower sense. Further, as a wider sense, the inverter switching timing used by each exemplary embodiment in the description indicates both a switching timing on the electrical angle axis and a switching timing on the time axis. The switching timing of at least a pair of the switching elements forming the electric power converter means a switching timing on the time axis as the narrower sense.

As shown in FIG. 9, the electrical angle θ of the motor generator 4 increases from 0 (deg.) to 360 (deg.) on the electrical angle θ axis according to the rotation of the motor generator 4. At the timing t0, the inverter control circuit 61 determines a next switching electrical angle θsw at the current timing t0, and updates the electrical angle θ to determine the current electrical angle θ0. The next switching electrical angle θsw is converted to the inverter switching timing tsw on the time axis t.

The boost converter switching inhibition period calculation means 52 calculates the boost converter switching inhibition period Pp on the basis of the inverter switching timing tsw.

Next, a description will now be given of the flow chart shown in FIG. 10.

In step S01E, the next switching electrical angle θsw is determined at the current t0, and the electrical angle θ is updated to obtain the current electrical angle θ0.

In S07E, the next switching electrical angle θsw on the electrical angle θ axis is converted to the next inverter switching timing on the time axis.

Next inverter switching timing $tsw$=(next switching electrical angle θ$sw$−current switching electrical angle θ0+electrical angle disturbance component)/360°×electric period $Te$ (3).

In step S09, like the process shown in FIG. 6, the boost converter switching inhibition period Pp is calculated.

For example, the third exemplary embodiment can directly use the electrical angle information when the motor generator 4 is driven by the phase control.

In each example which uses the switching timing on the time axis in the switching timing correction process explained later according to each exemplary embodiment, it is possible to convert the switching timing to the switching electrical angle.

Switching Timing Correction Process

Fourth Exemplary Embodiment

Figure 11:
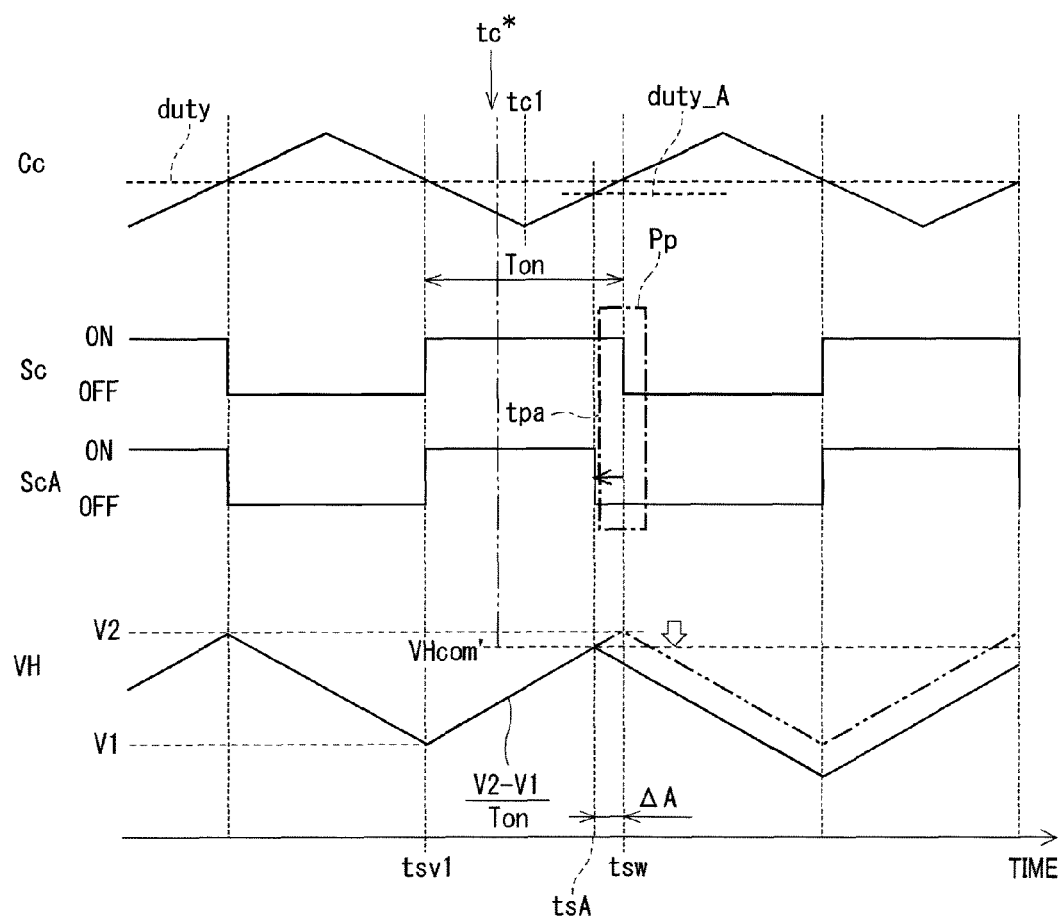
FIG. 11 is a view showing a timing chart of a switching timing correction process performed by the switching control device according to the fourth exemplary embodiment of the present invention.
Figure 12:
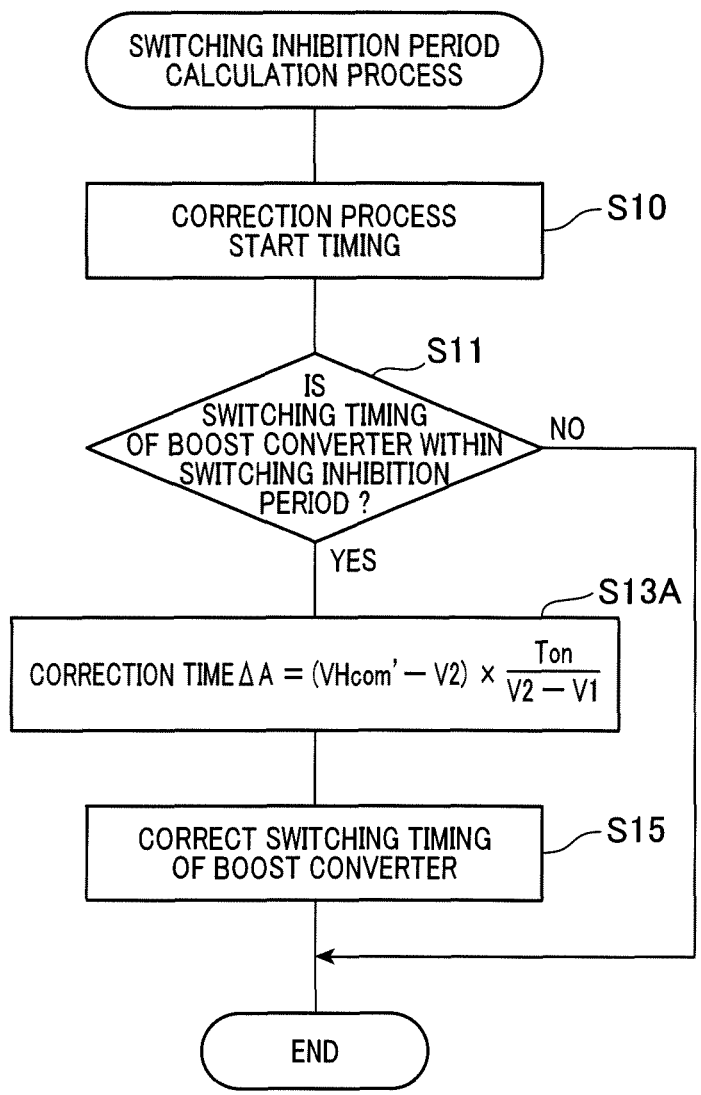
FIG. 12 is a view showing a flow chart of the switching timing correction process shown in FIG. 11.
Figure 13:
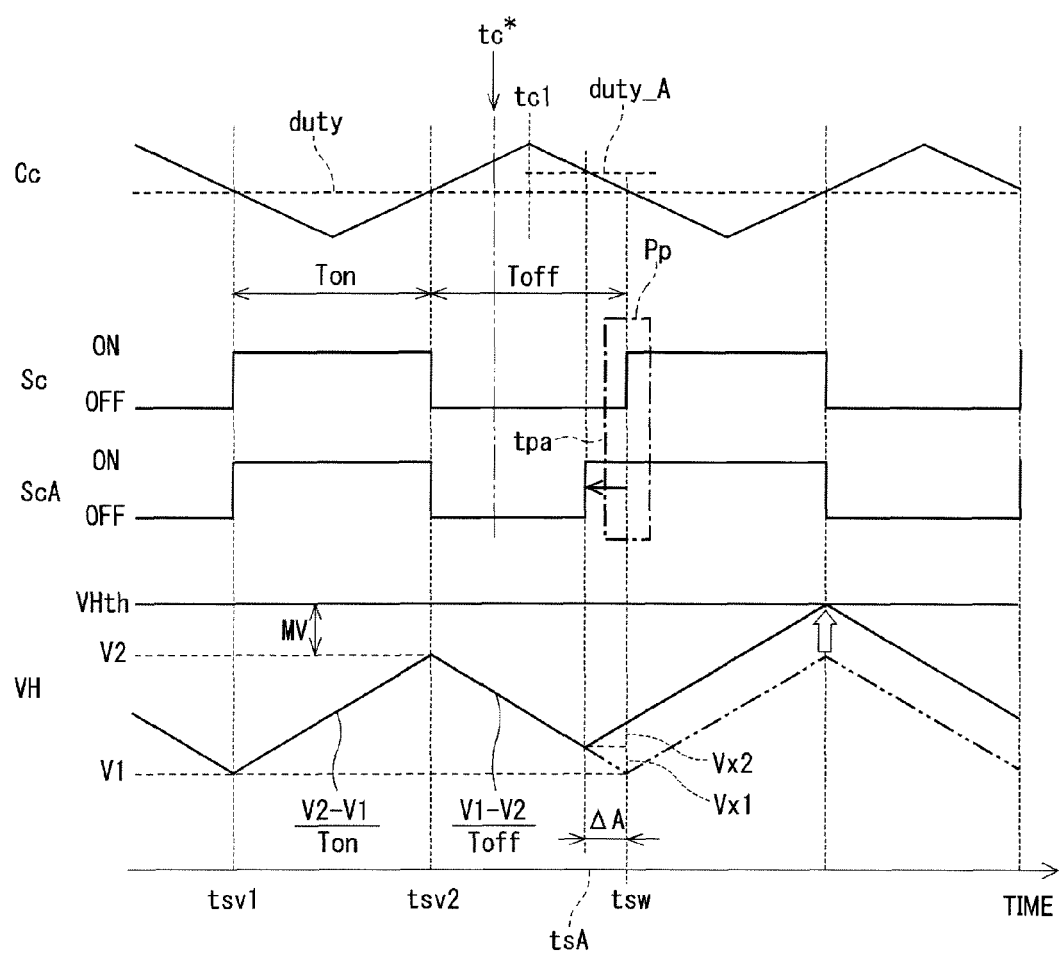
FIG. 13 is a view showing a timing chart of the switching timing correction process performed by the switching control device according to the fourth exemplary embodiment of the present invention.
Figure 14:
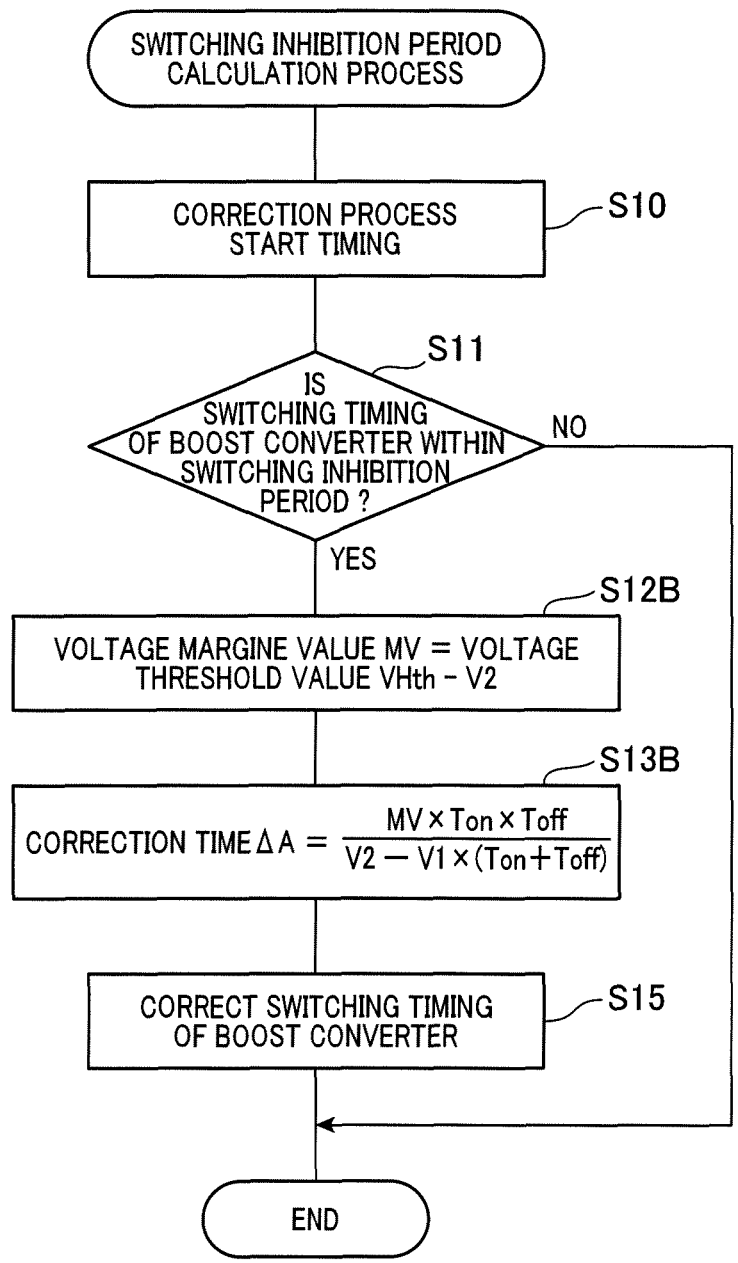
FIG. 14 is a view showing a flow chart of the switching timing correction process shown in FIG. 13.

Next, a description will be given of the switching timing correction process performed by the switching control device according to the fourth exemplary embodiment of the present invention with reference to FIG. 11, FIG. 13, FIG. 12 and FIG. 14. FIG. 11 and FIG. 13 show timing charts and FIG. 12 and FIG. 14 show flow charts. The first exemplary embodiment calculates an optimal correction time ΔA of the switching timing tsw of the correction target on the basis of the output voltage VH of the boost converter. FIG. 11 and FIG. 12 show the example using a minimum absolute value of the correction time ΔA. FIG. 13 and FIG. 14 show the example using a maximum absolute value of the correction time ΔA.

As shown in FIG. 11 and FIG. 13, the output voltage VH gradually increases when the drive signal Sc is the on state, i.e. during the turned-on period Ton in which the switching element 23 at a high voltage side is turned on. Further, the output voltage VH gradually decreases when the drive signal Sc is the off state, i.e. during the turned-off period Toff in which the switching element 23 at a high voltage side is turned off.

The output voltage VH has a minimal value V1 at the rising timing when the drive signal Sc is switched from the off state to the on state. At the falling timing when the drive signal Sc is switched from the on state to the off state, the output voltage VH has a maximal value V2.

The equation (4.1) expresses a rising slope (>0) when the output voltage VH increases (during tsv1 to tsv2 shown in FIG. 13). The equation (4.2) expresses a falling slope (<0) when the output voltage VH decreases (during tsv2 to tsw shown in FIG. 13).

Slope when the output voltage $VH$ increases=($V2$−$V1$)/$Ton$ (4.1), and

Slope when the output voltage $VH$ decreases=($V1$−$V2$)/$Toff$ (4.2).

The reference characters Ton and Toff show as follows:

Ton [s]: Turned-on time period of the switching element 23 at a high voltage side (=Turned-off time period of the switching element 24 at a low voltage side); and Toff [s]: Turned-off time period of the switching element 23 at a high voltage side (=Turned-on time period of the switching element 24 at a low voltage side).

In the example shown in FIG. 13, the converter carrier Cc has a crest at the timing tc1 after the switching timing tsw of the correction timing, and the switching timing tsw of the correction target is present during the period from the crest to the trough of the converter carrier Cc.

In this case, it is possible to bring forward the switching timing tsw of the correction target when the instruction voltage VHcom' after correction is set to a value which is smaller than the voltage V2 before correction.

Because a decrease between the voltage V2 before correction and the instruction voltage VHcom' after correction becomes an inverter controllability deterioration component, it is preferable to prevent the instruction voltage VHcom from being greatly decreased. So, the instruction voltage VHcom' after correction is determined by decreasing the duty before correction to the duty_A so that the switching timing tsw of the correction target approaches the start timing tpa of the switching inhibition period Pp.

Next, a description will be given of the flow chart shown in FIG. 12. In step S10, the correction process starts to correct the correction process start timing tc*. In step S11, it is detected whether or not it is predicted for the switching timing for the boost converter to be within the boost converter switching inhibition period Pp. When the detection result in step S11 indicates YES, in step S13A, the correction time ΔA (<0) is calculated by using the equation (4.3).

Correction time Δ$A$=($VH$com'−$V2$)×$Ton$/($V2$−$V1$) (4.3).

In step S15, the switching timing tsw of the boost converter is corrected to the timing tsA which is before the start timing tpa of the switching inhibition period Pp. This makes it possible to avoid the generation of superimposed surge while suppressing decreasing of controllability of the inverter 30 as small as possible.

In the example shown in FIG. 11, the converter carrier Cc has a trough at the timing tc1 after correction, and the switching timing tsw of the correction target is present during the period from the trough to the crest of the converter carrier Cc.

In this case, it is possible to increase the maximal value of the output voltage VH by a maximum current margin value MV which is a difference between the voltage threshold value VHth of the output voltage VH and its maximal value V2 before correction. Accordingly, it is possible to bring the switching timing tsw of the correction target apart from the start timing tpa of the boost converter switching inhibition period Pp when the duty before correction is increased to the duty_A.

The steps S10, S11 and S15 in the flow chart shown in FIG. 14 are substantially equal to the steps S10, S11 and S15 in the flow chart shown in FIG. 12. In FIG. 14, the processes in step S12B and S13B are different from the processes shown in FIG. 12. In step S12B, the voltage margin value MV is calculated by using the equation (5.1).

Voltage margin value MV=Voltage threshold value VHth−V2 (5.1).

In step S13B, the correction time ΔA (<0) is calculated by the equation (5.2).

Correction time ΔA=MV/(V1−V2)×(Ton×Toff)/(Ton+Toff) (5.2).

The equation (5.2) can be derived from FIG. 13 as follows:

Vx1=(V1−V2)/Toff×ΔA,

Vx2=(V1−V2)/Ton×ΔA, and

MV=Vx1+Vx2=(V1−V2)×(Ton+Toff)/(Ton×Toff)×ΔA.

This makes it possible to avoid generation of superimposed surge while the output voltage VH is set to a maximum value within the allowable range.

As previously described, the switching timing correction process performed in the fourth exemplary embodiment can calculate the optimal correction time ΔA for the switching timing tsw of the correction target on the basis of the output voltage VH.

Fifth Exemplary Embodiment

Figure 15:
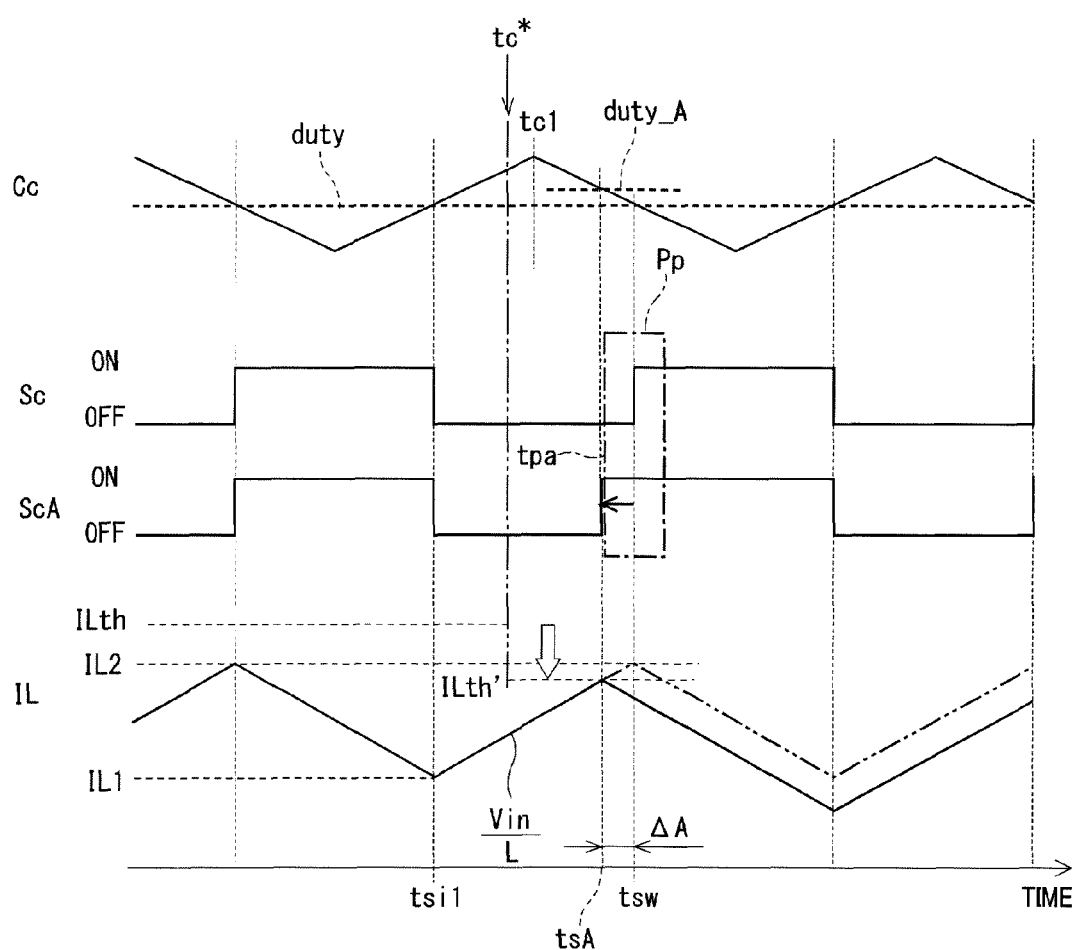
FIG. 15 is a view showing a timing chart of the switching timing correction process performed by the switching control device according to the fifth exemplary embodiment of the present invention.
Figure 16:
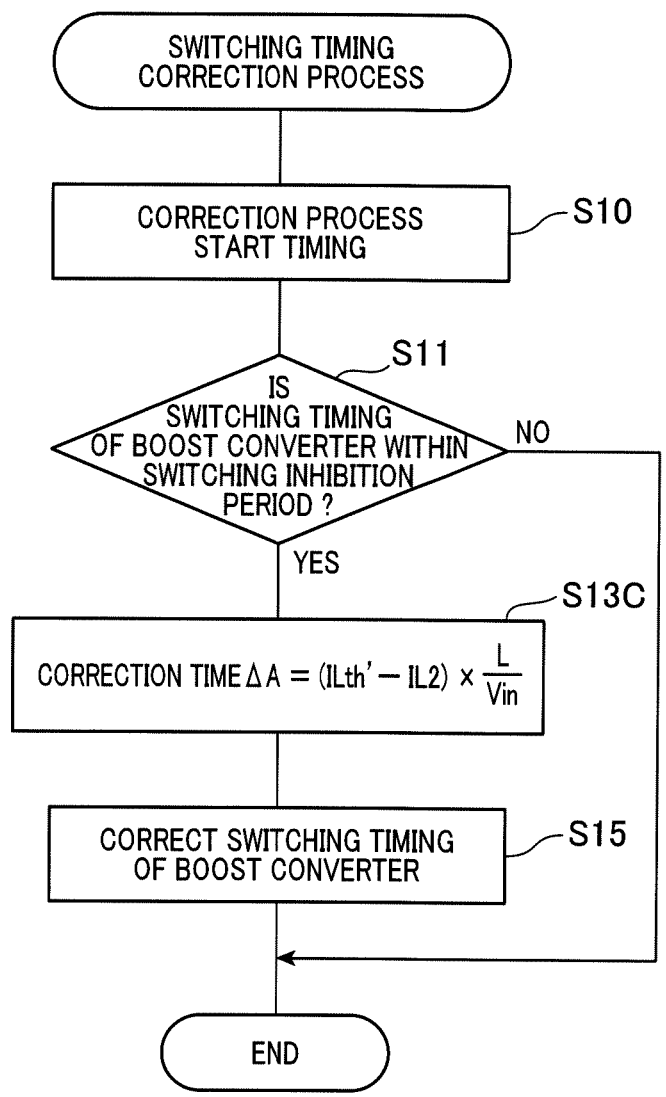
FIG. 16 is a view showing a flow chart of the switching timing correction process shown in FIG. 15.
Figure 17:
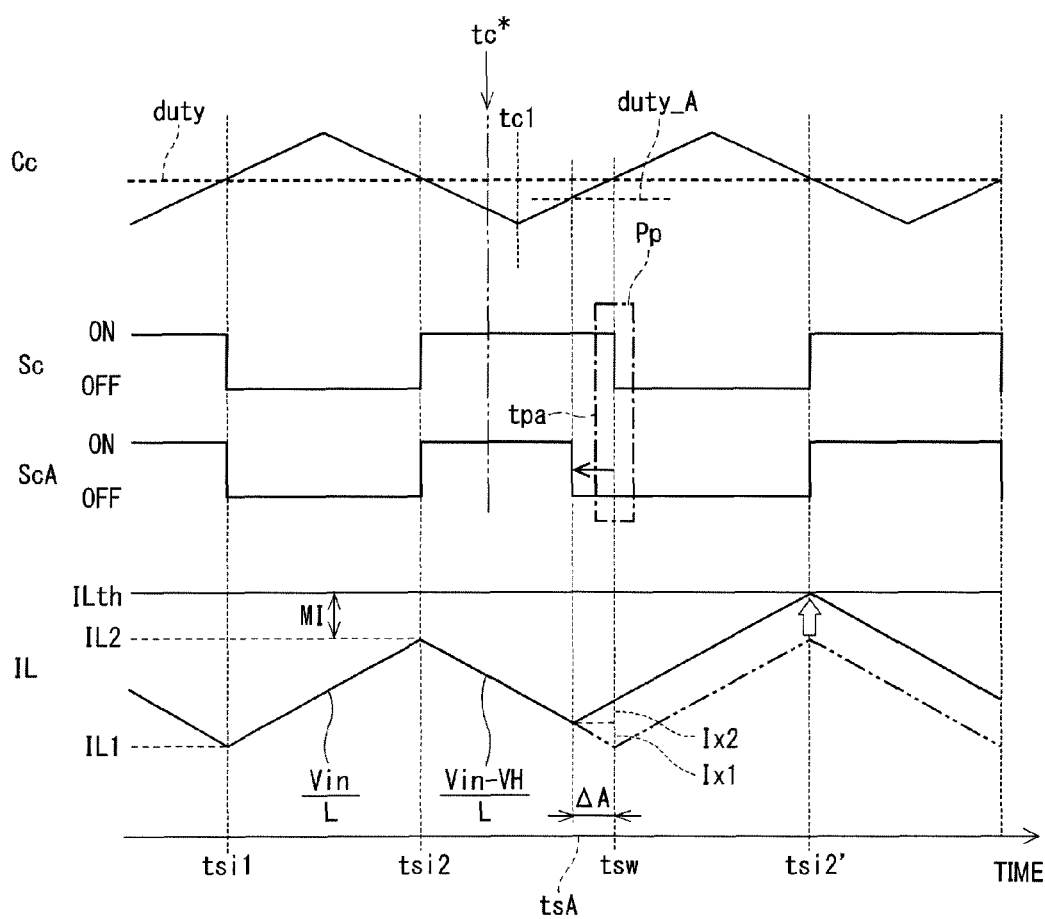
FIG. 17 is a view showing a timing chart of the switching timing correction process performed by the switching control device according to the fifth exemplary embodiment of the present invention.
Figure 18:
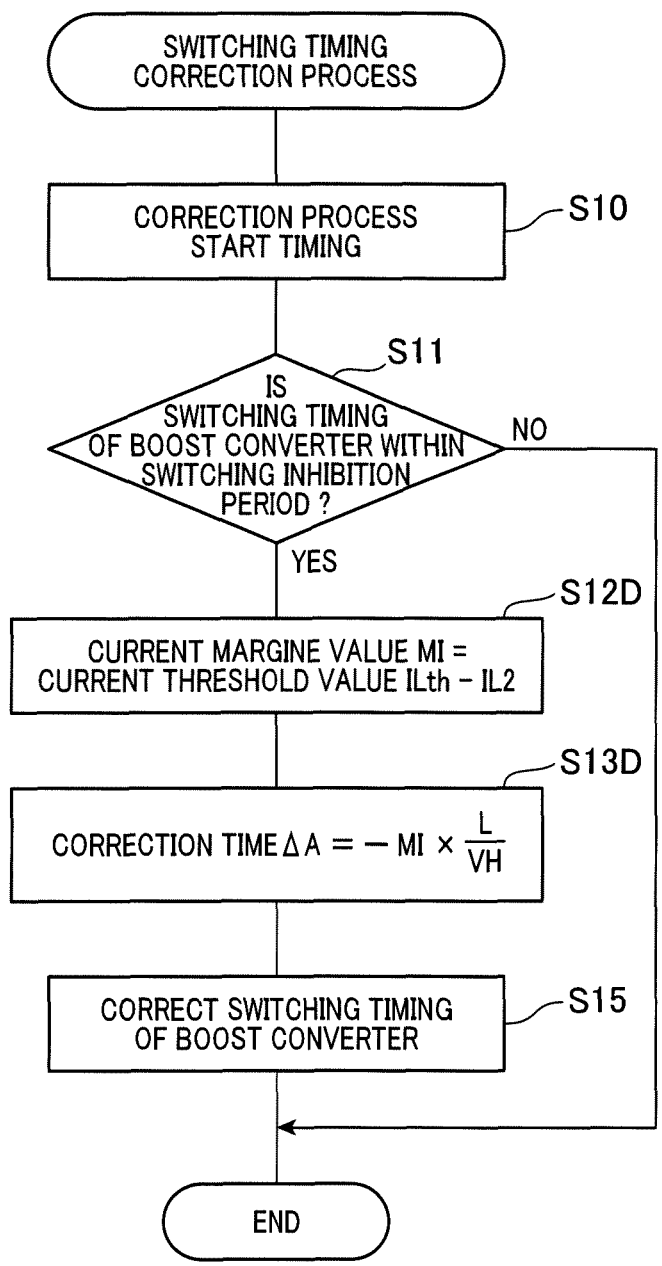
FIG. 18 is a view showing a flow chart of the switching timing correction process shown in FIG. 17.

A description will be given of the switching timing correction process according to the fifth exemplary embodiment of the present invention with reference to FIG. 15, FIG. 17, FIG. 16 and FIG. 18. FIG. 15 and FIG. 15 show timing charts and FIG. 16 and FIG. 18 show flow charts. Because the steps S10, S11 and S15 in the flow chart shown in FIG. 16 and FIG. 18 are the same of those in FIG. 12, the following explanation is given of the different steps only.

The fifth exemplary embodiment calculates an optimal correction time ΔA for the switching timing tsw of the correction target on the basis of the reactor current IL. The example shown in FIG. 15 and FIG. 16 has the minimum correction time ΔA, and FIG. 17 and FIG. 18 show the example in which the absolute value of the correction time ΔA has the maximum value.

The fifth exemplary embodiment explains a case in which the reactor current IL flows in a forward direction when the motor generator 4 operates as the electric motor and generates a drive torque. It is possible for the current sensor mounted in the boost converter 20 to detect the reactor current IL, or it is possible to calculate the reactor current IL by using the equation (6).

$$IL\_est = \frac{Nm \times trq}{VH} + \frac{Vin}{L} \times \frac{Toff}{2} \qquad (6)$$

where
IL_est [A]: reactor current (estimated value);
Nm [1/s]: rotation speed of the motor generator 4;
trq [V·A·s]: torque of the motor generator 4;
L [V·s/A]: inductance of the reactor 21; and
Toff [s]: turned-off period of the switching element 23 at a high voltage side (=turned-on period of the switching element 23 at a low voltage side).

L corresponds to a circuit constant of the boost converter 20 (direct current voltage converter), and Nm, trq correspond to behavior information or operation information.

As shown in FIG. 15 and FIG. 17, when the drive signal Sc is the on state, i.e. during the turned-on period of the switching element 23 at a high voltage side, the reactor current IL gradually decreases. When the drive signal Sc is in the off state, i.e. during the turned-off period of the switching element 23 at a high voltage side, the reactor current IL gradually increases. The reactor current IL has a minimal value IL1 at the falling timing when the derive signal Sc is switched from the on state to the off state. The reactor current IL has a maximal value IL2 at the rising timing when the derive signal Sc is switched from the off state to the on state.

The equation (7.1) expresses a slope (>0) when the reactor current IL increases (during tsi1 to tsi2 shown in FIG. 17) and the equation (7.2) expresses a slope (<0) when the reactor current IL decreases (during tsi2 to tsw shown in FIG. 17) by using the input voltage Vin of the boost converter 20 and the inductance L of the reactor 21.

Slope when the reactor current IL increases=Vin/L (7.1), and

Slope when the reactor current IL decreases=(Vin−VH)/L (7.2).

In the example shown in FIG. 15, the converter carrier Cc has a crest at the timing tc1 after the switching timing tsw of the correction target, and the switching timing tsw of the correction target is present at the rising timing of the drive signal Sc during the period in which the carrier Cc falls from the crest to the trough.

In this case, it is possible to bring forward the switching timing tsw of the correction target by setting a value which is smaller than the maximal value IL2 before correction to the current threshold value ILth' of the reactor current IL after correction. However, because a decreased amount of the maximal value IL2 of the reactor current IL becomes an inverter-controllability estimated deterioration component, it is necessary to decrease the current threshold value ILth more than necessary.

It is possible to determine the current threshold value ILth' after correction by decreasing the duty after correction to the duty_A so that the switching timing tsw of the correction target approaches the start timing tpa of the switching inhibition period Pp.

In step S13C shown in FIG. 16, the correction time ΔA (<0) is calculated by using the equation (7.3).

Correction time ΔA=(ILth'−IL2)×(L/Vin) (7.3).

This makes it possible to avoid generation of superimposed surge while suppressing deterioration of controllability of the inverter 30 as low as possible.

In the example shown in FIG. 17, the converter carrier Cc has a trough at the timing tc1 after correction, and the switching timing tsw of the correction target is present at the falling timing of the drive signal Sc during the period in which the carrier Cc is switched from the trough to the crest.

In this case, when a difference between the current threshold value ILth of the reactor current IL and the maximal value IL2 before correction is a current margin value MI, it is possible to decrease the maximal value by the current margin value MI at the most. Accordingly, the duty before correction is decreased to the duty_A so that the maximal value of the reactor current IL after correction becomes equal to the current threshold value ILth. This makes it possible to separate the switching timing tsw of the correction target from the start timing tpa of the switching inhibition period Pp.

In step S12D shown in FIG. 18, the current margin value MI is calculated by using the equation (8.1).

$$\text{Current margin value } MI = \text{current threshold value } I\text{th} - IL2 \quad (8.1)$$

In step S13D, the correction time $\Delta A$ (<0) is calculated by using the equation (8.2).

$$\text{Correction time } \Delta A = -MI \times (L/VH) \quad (8.2)$$

The equation (8.2) can be introduced by referring FIG. 17 as follows:

$$I \times 1 = (Vi - VH)/L \times \Delta A,$$

$$I \times 2 = -Vin/L \times \Delta A, \text{ and}$$

$$MI = I \times 1 + I \times 2 = -VH/L \times \Delta A.$$

This makes it possible to avoid generation of superimposed surge while having the reactor current IL within an allowable range as large as possible.

As previously described, the switching timing correction process performed by the fifth exemplary embodiment calculates an optimal correction time $\Delta A$ for the switching timing tsw of the correction target on the basis of the reactor current.

Sixth Exemplary Embodiment

Figure 19:
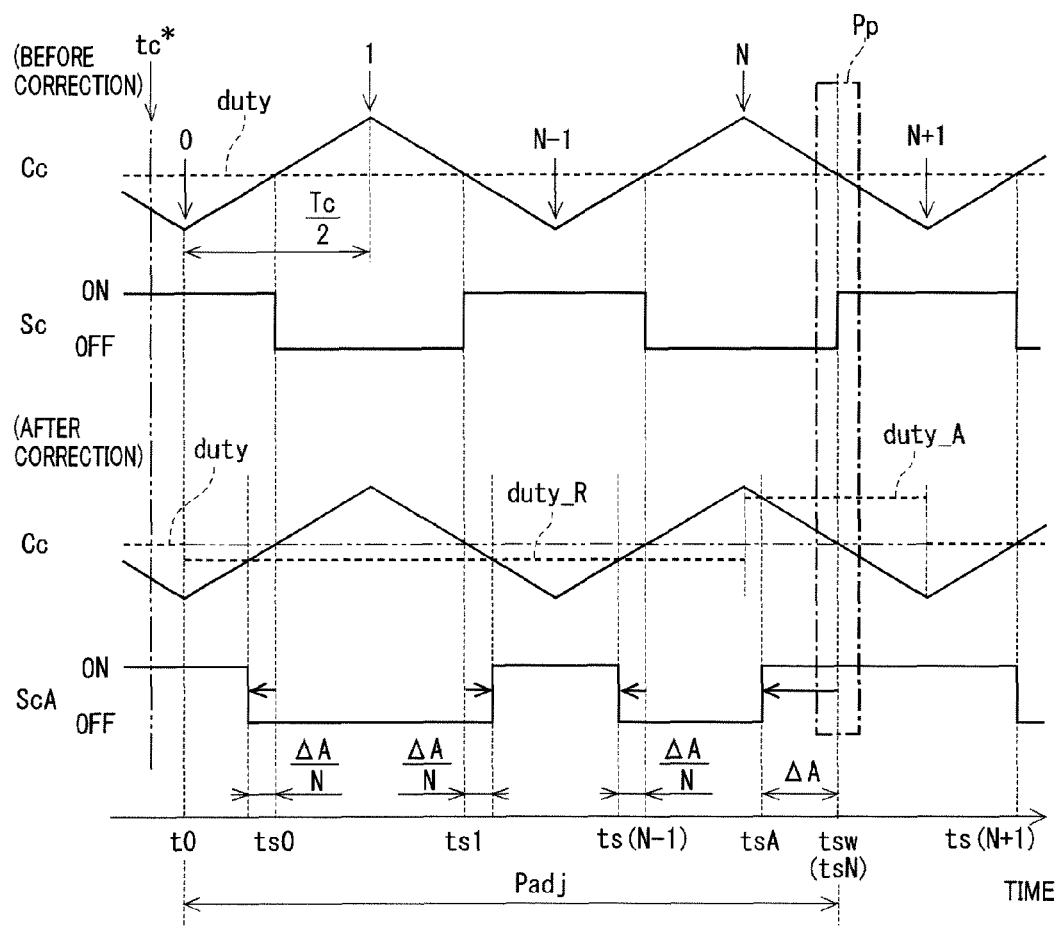
FIG. 19 is a view showing a timing chart of the switching timing correction process performed by the switching control device according to the sixth exemplary embodiment of the present invention.
Figure 20:
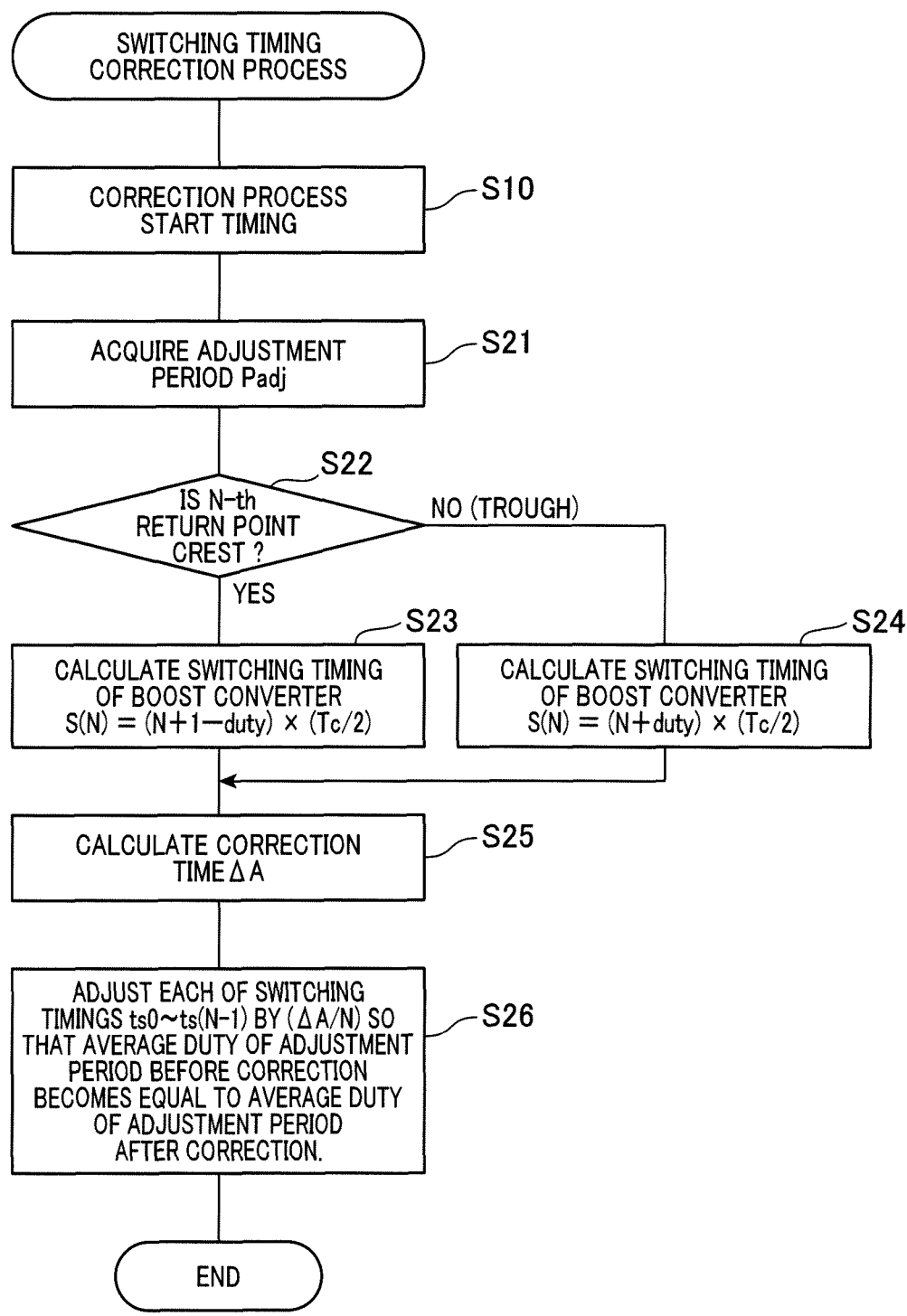
FIG. 20 is a view showing a flow chart of the switching timing correction process shown in FIG. 19.

A description will be given of the switching timing correction process performed by the switching control device according to the sixth exemplary embodiment of the present invention with reference to FIG. 19 and FIG. 20. FIG. 19 shows a timing chart and FIG. 20 shows a flow chart. The sixth exemplary embodiment has a feature of adjusting the switching timing before the switching timing tsw of the correction target in addition to correct the switching timing tsw of the correction target. It is possible to combine the calculation of the correction time $\Delta A$ of the switching timing tsw of the correction target with the process of another exemplary embodiment.

For example, when the correction is performed to bring forward the rising timing of the switching timing of the correction target, the turned-on time of the switching element 23 at a high voltage side becomes longer than its turned-on time before correction. Accordingly, there is a possible case that the actual output voltage VH of the boost converter fluctuates against the instruction voltage VHcom transmitted from the boost converter control circuit 51. The sixth exemplary embodiment can suppress fluctuation of the output voltage VH caused by the correction.

As shown in FIG. 19, a crest or trough of the carrier Cc immediately after the correction process start timing tc* is the 0-th turning point. After this, the next turning points occur every half carrier period (Tc/2), which will be referred to as the first turning point, the second return period, . . . . In addition, the time corresponding to the 0-th turning point is referred to as the process reference time t0. During the period between the turning points, the switching timing of the drive signal Sc occurs at the timing when the carrier Cc and the duty intersect each other. The switching timing occurs between the o-th turning point and the first turning point is designated by reference character ts0. The switching timing occurs between the first turning point and the second turning point is designated by reference character ts1. The switching timing occurs between the (N−1)-th turning point and the N-th turning point is designated by reference character ts(N−1).

The switching control device according to the sixth exemplary embodiment determines the correction process start timing tc* at least before a half carrier period (Tc/2) against the switching inhibition period Pp. The turning point of the carrier Cc immediately before the switching inhibition period Pp is referred to as the N-th turning point, where N is an integer of not less than 1.

In the example shown in FIG. 19, the switching inhibition period Pp is present during the period from the crest as the N-th turning point to the trough as the (N+1)-th turning point of the carrier Cc. The switching timing tsw (which corresponds to tsN) of the correction target, which is predicted to enter the switching inhibition period Pp, is a rising timing.

The switching timing tsw of the correction target is corrected to the timing tsA which is before the start timing of the switching inhibition period Pp by increasing the duty before correction to the duty_A. It is possible to apply, to the sixth exemplary embodiment as a concrete correction process, the correction process performed by the switching control device according to the fourth and fifth exemplary embodiments or other exemplary embodiments. When the switching timing tsw of the correction target is a rising timing, the turned-on time increases by the correction time $\Delta A$.

The switching control device according to the sixth exemplary embodiment uses the adjustment period Padj counted from the process reference time t0 to the switching timing tsw of the correction target. The switching control device according to the sixth exemplary embodiment adjusts the N switching timings ts0 to is (N−1) before the switching timing tsw of the correction target so that the average duty before correction is equal to the average duty after correction during the adjustment period Padj. In order to perform this adjustment, the duty during the adjustment period Padj is moved in opposite direction to the duty_A to obtain the duty_R. This makes it possible to shift each of the N switching timings ts0 to ts(N−1) by the adjustment time ($\Delta A/N$) obtained by dividing the correction time $\Delta A$ equally by N. In a concrete example, it is possible to decrease the turned-on time by shifting the rising timing backward and the falling timing forward. The sum of the N adjustment times becomes the value $\Delta A$ which is equal to the correction time $\Delta A$. As a result, the increased amount of the turned-on time by the correction of the switching timing tsw of the correction target becomes offset by the decreasing of the turned-on time after the adjustment, and the average duty of the adjustment period Padj has the equal value before correction and after correction.

A description will now be given of the process with reference to FIG. 20. In step S10, the correction process starts at the correction process start timing tc*. In step S21, the adjustment period Padj is acquired.

In step S22, it is detected whether the N-th turning point of the carrier Cc immediately before the switching timing tsw of the correction target is a crest or a trough.

When the N-th turning point of the carrier Cc is a crest (YES in step S22), the operation flow goes to step S23. In step S23, the time S (N) counted from the process reference timing t0 to the switching timing tsw of the correction target is calculated by using the equation (9.1).

$$S(N)=(N+1-\text{duty})\times(Tc/2) \quad (9.1).$$

When the N-th turning point of the carrier Cc is a trough (NO in step S22), the operation flow goes to step S24. In step S24, the time S (N) counted from the process reference timing t0 to the switching timing tsw of the correction target is calculated by using the equation (9.2).

$$S(N)=(N+\text{duty})\times(Tc/2) \quad (9.2).$$

In step S25, the correction time ΔA against the switching timing tsw of the correction target is calculated.

In step S26, the N switching timings ts0 to ts(N−1) before the switching timing tsw of the correction target are adjusted so that the average duty of the adjustment period Padj before correction becomes equal to the average duty of the adjustment period Padj after correction. For example, the adjustment time (ΔA/N) obtained by dividing the correction time ΔA equally by N is determined and used for the N switching timings ts0 to ts(N−1) as the correction target.

The switching control device according to the sixth exemplary embodiment as previously described, corrects the switching timing tsw of the correction target to be outside of the switching inhibition period Pp. This makes it possible to prevent generation of superimposed surge and maintain the constant average of the output value VH of the boost converter 20 during the adjustment period Padj.

When the switching timing tsw of the correction target is a falling timing, which is opposite to the example shown in FIG. 19, the turned-on time of the switching timings ts0 to ts(N−1) during the adjustment period Padj is increased in order to offset the decreasing of the turned-on time due to the correction.

In addition, it is acceptable to provide different adjustment time to the switching timings ts0 to ts(N−1) during the adjustment period Padj so that the total sum of the adjustment times becomes the correction time ΔA.

Seventh Exemplary Embodiment

Figure 25:
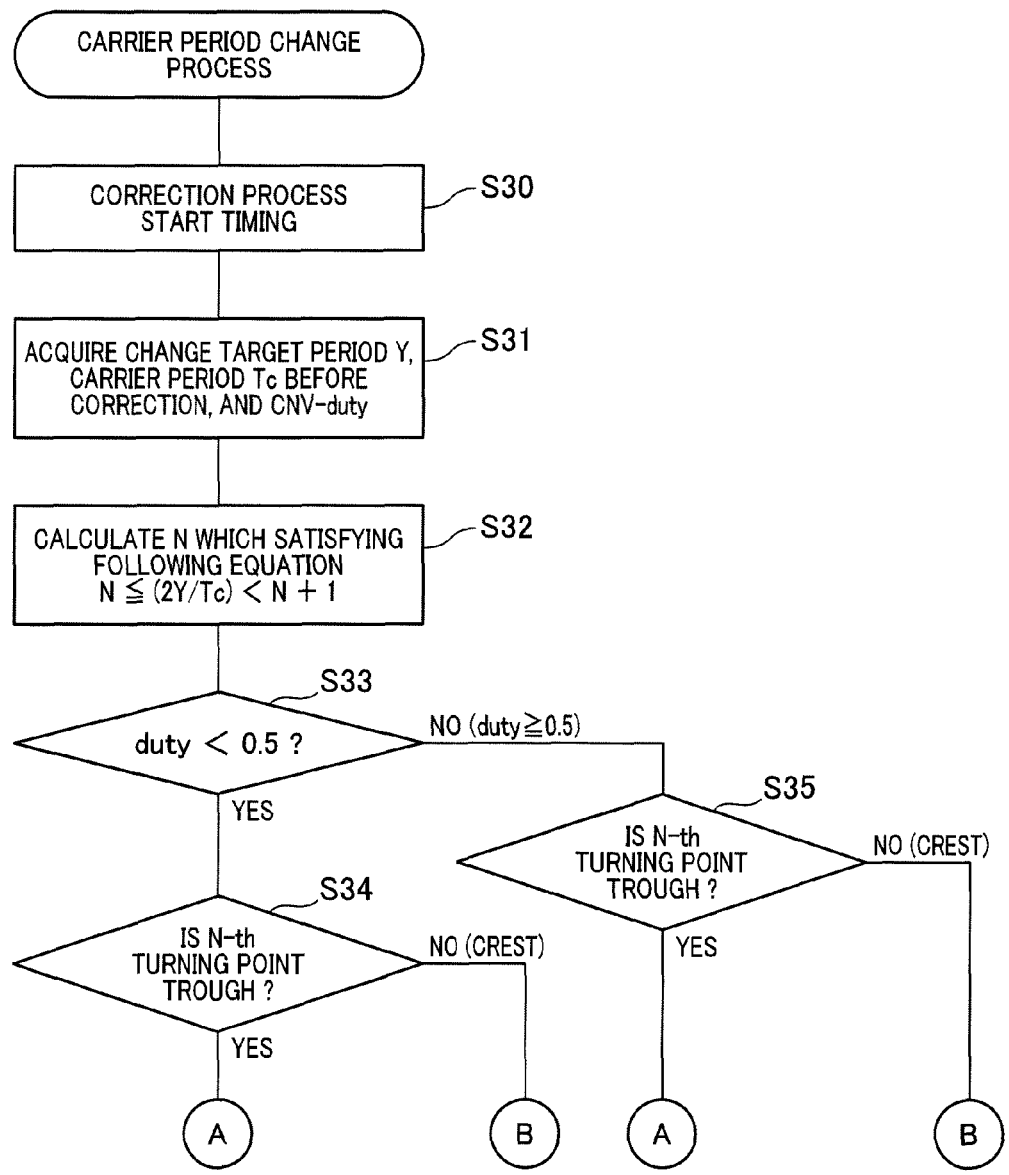
FIG. 25 is a view showing a flow chart (1) of the carrier period change process shown in FIG. 21 to FIG. 24.
Figure 26:
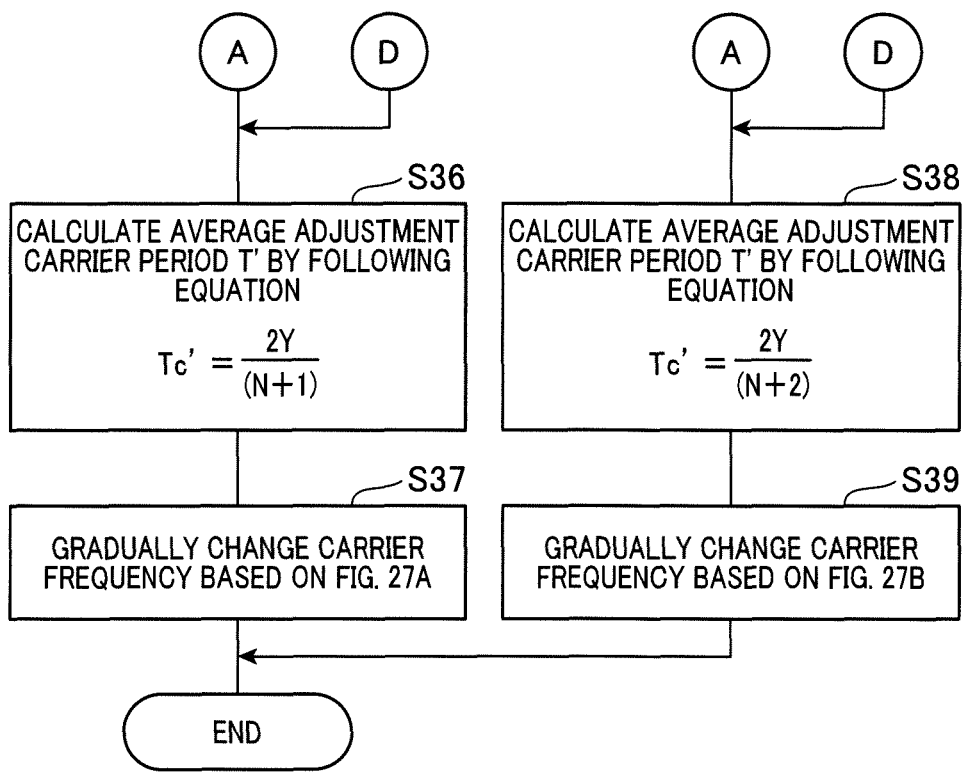
FIG. 26 is a view showing a flow chart (2) of the carrier period change process shown in FIG. 21 to FIG. 24.

A description will be given of the carrier period change process performed by the switching control device according to the seventh exemplary embodiment with reference to FIG. 21 to FIG. 24, FIG. 25, FIG. 26, and FIG. 27. FIG. 21 to FIG. 24 show timing charts. FIG. 25 and FIG. 26 show flow charts. The switching timing correction process performed by the switching control device according to the fourth to sixth exemplary embodiments corrects the switching timing tsw of the correction target by changing the duty. The seventh and eighth exemplary embodiments correct the switching timing tsw of the correction target by changing the period Tc of the converter carrier Cc.

In the explanation of the seventh and eighth exemplary embodiments, the term carrier means the converter carrier, and the term duty indicates the converter duty.

As shown in FIG. 21 to FIG. 24, the switching control device according to the seventh exemplary embodiment uses the words N-th turning point (N is an integer of not less than 1), and process reference time t0. Similar to the sixth exemplary embodiment, the switching timing tsw of the correction target during the N-th turning point and the (N+1)-th turning point is corrected to be before the start timing tpa of the switching inhibition period Pp.

In the seventh exemplary embodiment reduces the carrier period Tc before correction during the change target period X. The change target period X is counted from the 0-th turning point corresponding to the process reference time T0 to the (N+1)-th turning point over the switching timing tsw of the correction target or the (N+2) turning point. The time length of the change target period X is (N+1) or (N+2) times of the half carrier period (Tc/2).

It is possible to select the end point of the change target period X from the (N+1)-th turning point and the (N+2)-th turning point on the bases of the following four process patterns:

whether or not the duty is less than 0.5 or not less than 0.5; and whether or not the N-th turning point of the carrier Cc is a crest or a trough.

The case in which the N-th turning point of the carrier Cc is a trough indicates that the switching timing tsw of the correction target is present during the period when the carrier Cc rises from a trough to a crest. The case in which the N-th turning point of the carrier Cc is a crest indicates that the switching timing tsw of the correction target is present during the period when the carrier Cc rises from a crest to a trough.

A change target period Y indicates a period from the process reference time t0 to the switching timing tsw of the correction target. As commonly shown in FIG. 21 to FIG. 24, the carrier signal Cc and the corresponding drive signal Sc (bold solid part) during the change target period X is reduced to the change target period Y by the change timing correction process. As a result, the turning point as the end point of the change target period X becomes equal to the switching timing tsw of the correction target. The switching timing tsw of the correction target is corrected to a timing tsA before the start timing tpa of the switching inhibition period Pp.

The switching timings tsA and tsB, which are present before and after the switching inhibition period Pp and are designated by reference character O at which the carrier Cc after correction and the duty are crossed with each other. The seventh exemplary embodiment adjusts the switching timings tsA and tsB to be apart from the switching inhibition period Pp as apart as possible. In other words, the seventh exemplary embodiment adjusts the switching inhibition period Pp so that the switching inhibition period Pp is arranged at an intermediate between the switching timings tsA and tsB.

This reason is as follows. When the feedback control adjusts the duty of the boost converter, even if the carrier period (frequency) is changed at a timing, there is a possible case in which the switching timing is overlapped with the switching inhibition period Pp, and it is necessary to change the carrier period (frequency) every correction process, and the output voltage Vh, and as a result, the reactor current IL fluctuates, and the torque change of the motor generator 4 becomes worse.

In order to avoid this, the carrier period (frequency) is changed so that the switching timing before or after the switching inhibition period Pp is apart from the switching inhibition period Pp, as apart as possible. This makes it possible to gradually change the carrier period (frequency) during a long period.

Next, the process shown in each of FIG. 21 to FIG. 24 will be explained. FIG. 21 to FIG. 24 show the following four process patterns (A) to (D).

Figure 21:
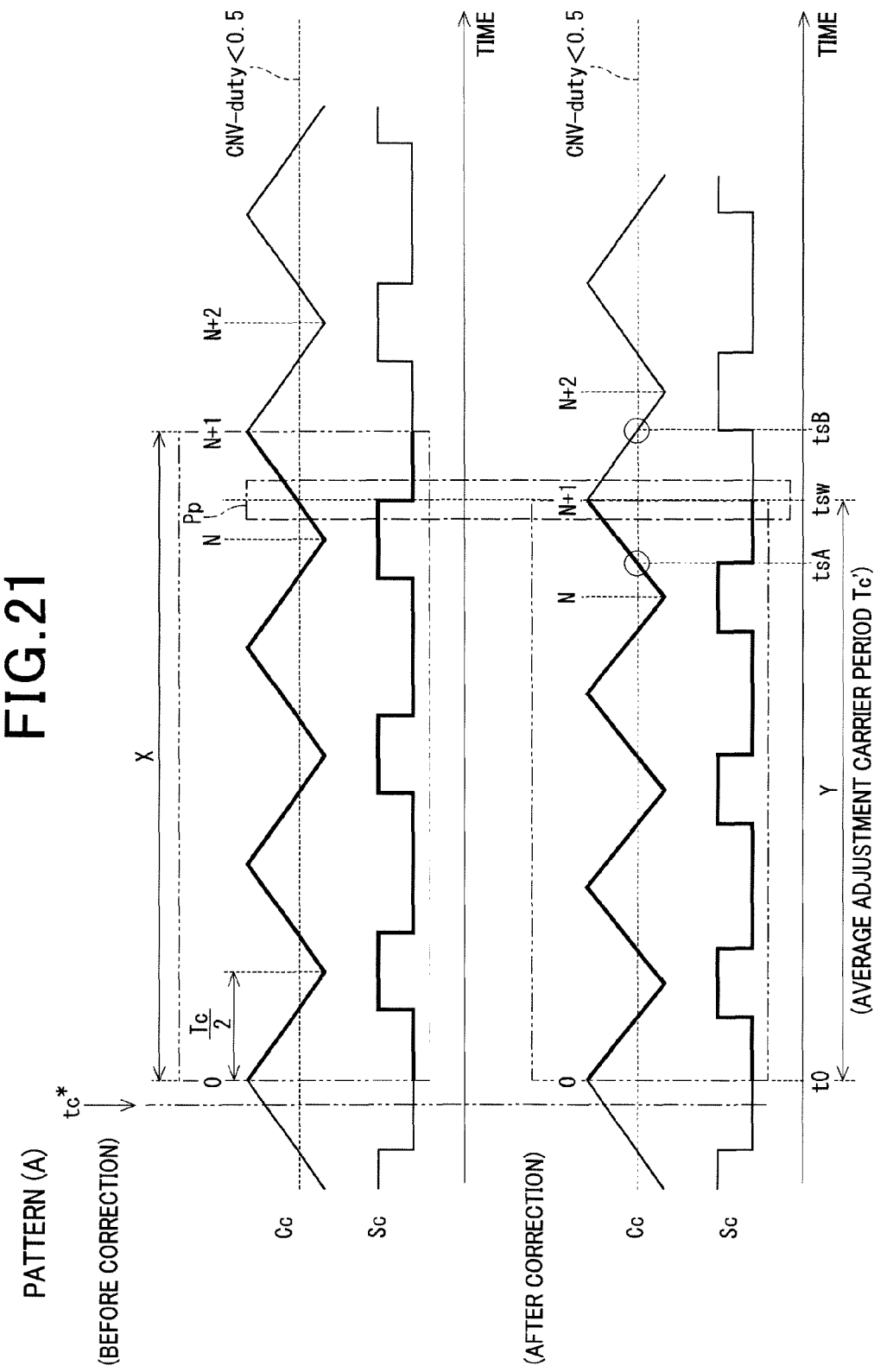
FIG. 21 is a view showing a timing chart of a carrier period change process (pattern (A)) performed by the switching control device according to the seventh exemplary embodiment of the present invention.

FIG. 21 . . . (A) duty<0.5, when the N-th turning point of the carrier Cc is a trough.

Figure 22:
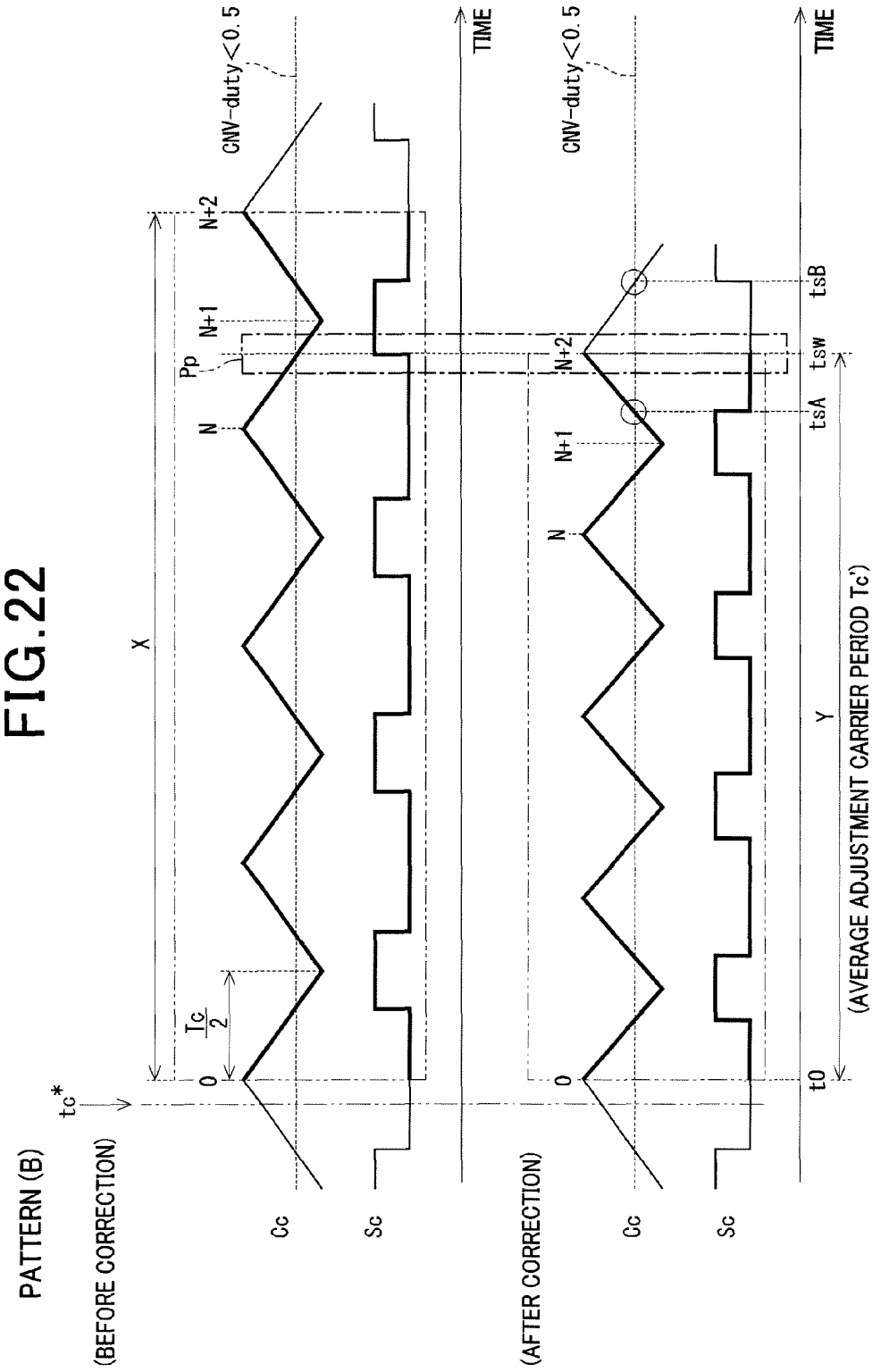
FIG. 22 is a view showing a timing chart of a carrier period change process (pattern (B)) performed by the switching control device according to the seventh exemplary embodiment of the present invention.

FIG. 22 . . . (B) duty<0.5, when the N-th turning point of the carrier Cc is a crest.

Figure 23:
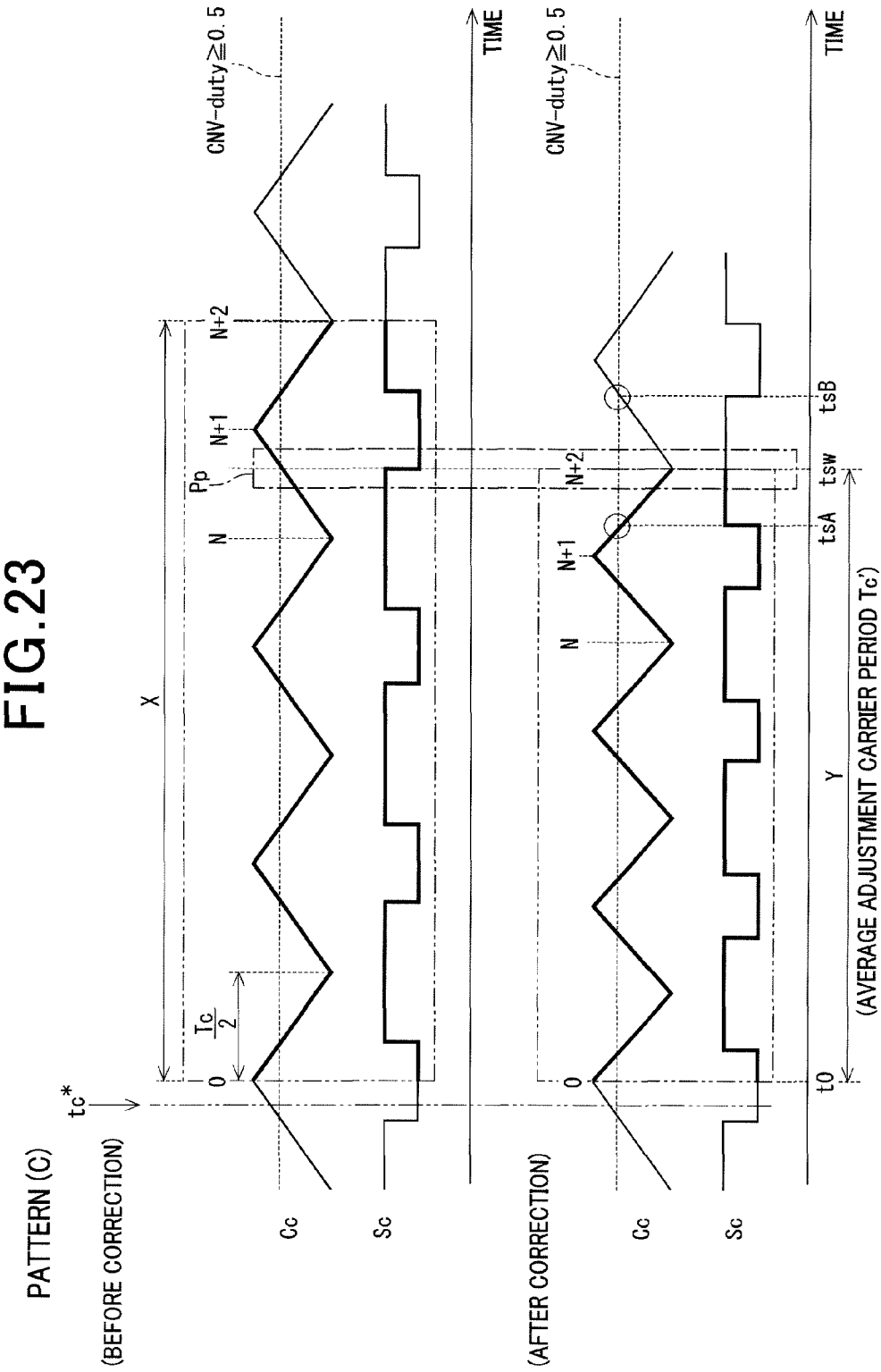
FIG. 23 is a view showing a timing chart of a carrier period change process (pattern (C)) performed by the switching control device according to the seventh exemplary embodiment of the present invention.

FIG. 23 . . . (C) duty>=0.5, when the N-th turning point of the carrier Cc is a trough.

Figure 24:
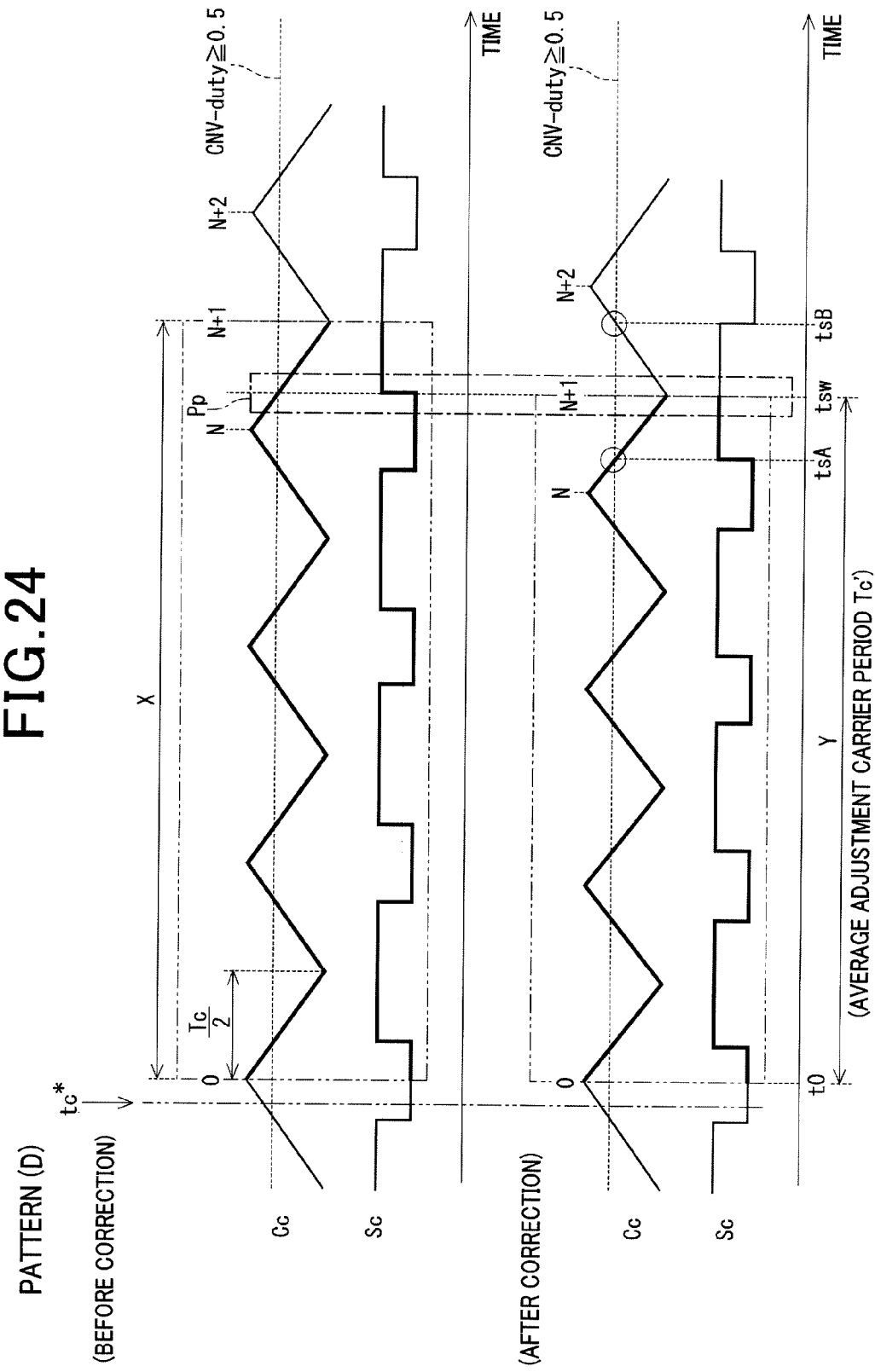
FIG. 24 is a view showing a timing chart of a carrier period change process (pattern (D)) performed by the switching control device according to the seventh exemplary embodiment of the present invention.

FIG. 24 . . . (D) duty>=0.5, when the N-th turning point of the carrier Cc is a crest.

In the examples shown in FIG. 21 and FIG. 24, the switching inhibition period Pp is near the N-th turning point between the N-th turning point and the (N+1)-th turning point before correction. That is, the switching inhibition period Pp is relatively apart from the (N+1)-th turning point. In this example, when the period until the N-th turning point is used as the change target period X, it is possible for the switching timings tsA and tsB before and after correction to be apart from the switching inhibition period Pp as apart as possible.

In the examples shown in FIG. 22 and FIG. 23, the switching inhibition period Pp is close to the (N+1)-th turning point between the N-th turning point and the (N+1)-th turning point before correction. That is, the switching inhibition period Pp is relatively close to the (N+1)-th turning point. In this example, when the period until the (N+2)-th turning point is used as the change target period X, it is possible for the switching timings tsA and tsB before and after correction to be apart from the switching inhibition period Pp as apart as possible.

A description will be given of the processes with reference to FIG. 25, FIG. 26, FIG. 27A and FIG. 27B.

In the flow chart shown in FIG. 25, when the correction process starts at the correction process start timing tc* (step S30), the change target period T, the carrier period Tc before correction and the duty are acquired (step S31).

In step S32, the value N is obtained when the carrier turning point immediately before the switching timing tsw of the correction target is the N-th turning point (N is an integer of not less than 1). That is, the value N is obtained, which satisfies the following equation (10.1).

$$N<=(2Y/Tc)<N+1 \qquad (10.1).$$

In a case when (2Y/Tc)=N, because the duty is 0 or 1, an unanticipated situation occurs and it is possible to control this by the actual control process. Accordingly, it is possible to put the equal sign at the right side or left side in the equation (10.1).

In step S33, it is detected whether the duty is less than 0.5 or not less than 0.5. In an actual case, because the switching control device having a smallest resolution of 0.5 can exclude a case having the duty of 0.5, it is acceptable to use—not more than 0.5 or exceed 0.5—instead of using—less than 0.5 or not less than 0.5—.

In steps S34 and S35, the judgment result indicates YES when the N-th turning point of the carrier Cc is a trough, and NO when the N-th turning point of the carrier Cc is a crest.

There are the following four patterns (A) to (D) corresponding to FIG. 21 to FIG. 24, respectively.
(A) S33: YES, S34: YES . . . corresponding to FIG. 21.
(B) S33: YES, S34: NO . . . corresponding to FIG. 22.
(C) S33: NO, S34: YES . . . corresponding to FIG. 23.
(D) S33: NO, S34: NO . . . corresponding to FIG. 24.

Figure 27A:
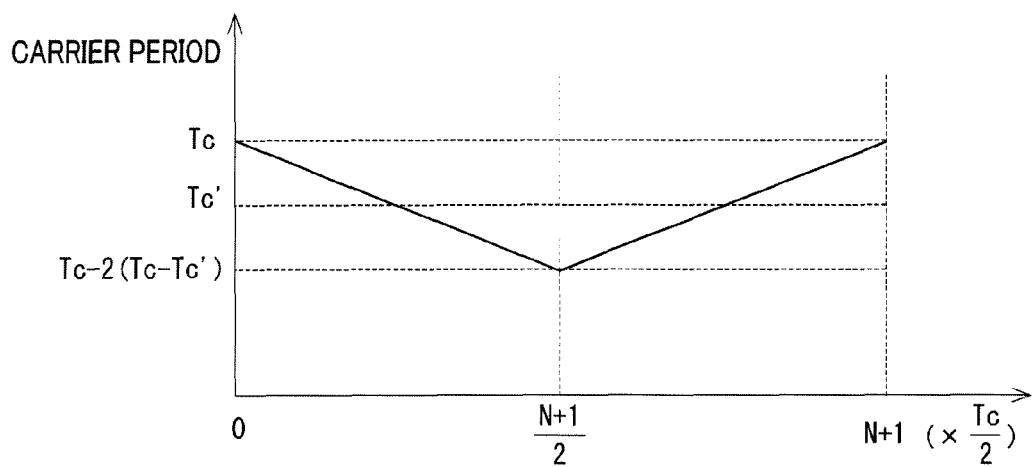
FIG. 27A and FIG. 27B are views showing a change of the carrier period in step S37 and step S39 in the flow chart of the carrier period change process shown in FIG. 26.

In the patterns (A) and (D), an average carrier adjustment period Tc' is calculated by the equation (10.2) (step S36), the carrier period is gradually changed according to FIG. 27A.

$$Tc'=2Y/(N+1) \qquad (10.2).$$

Figure 27B:
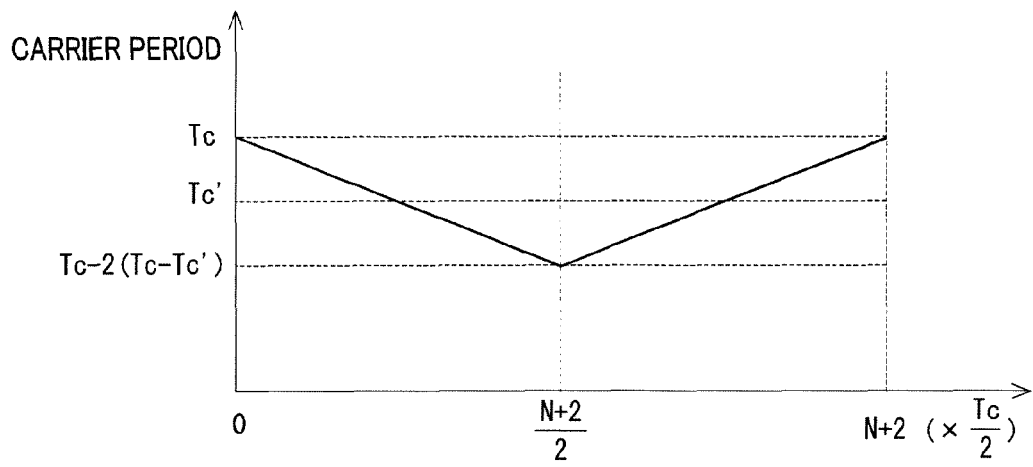

In the patterns (B) and (C), the average carrier adjustment period Tc' is calculated by the equation (10.3) (step S38), the carrier period is gradually changed according to FIG. 27B.

$$Tc'=2Y/(N+2) \qquad (10.3).$$

The method shown in FIG. 27A and FIG. 27B maintains the carrier period TC at the start and end of the change target period X, and adjusts the carrier period Tc during the intermediate point of the change target period Y so that the carrier period is reduced rather than the average adjustment carrier period Tc' by a difference between the carrier period Tc before correction and the average adjustment carrier period Tc'. The method further gradually reduces the carrier period toward the intermediate point from the start of the change target period Y, and gradually increases the carrier period from the intermediate point to the end point of the change target period Y.

This makes it possible to adjust the average carrier period in the change target period Y to the average adjustment carrier period Tc', and avoid a rapid change of the carrier period at the start point and the end point of the change target period Y.

By the way, the gradual change of the carrier period (designated by the bold solid line) after correction of the switching timing is omitted from FIG. 21 to FIG. 24.

Eighth Exemplary Embodiment

Figure 28:
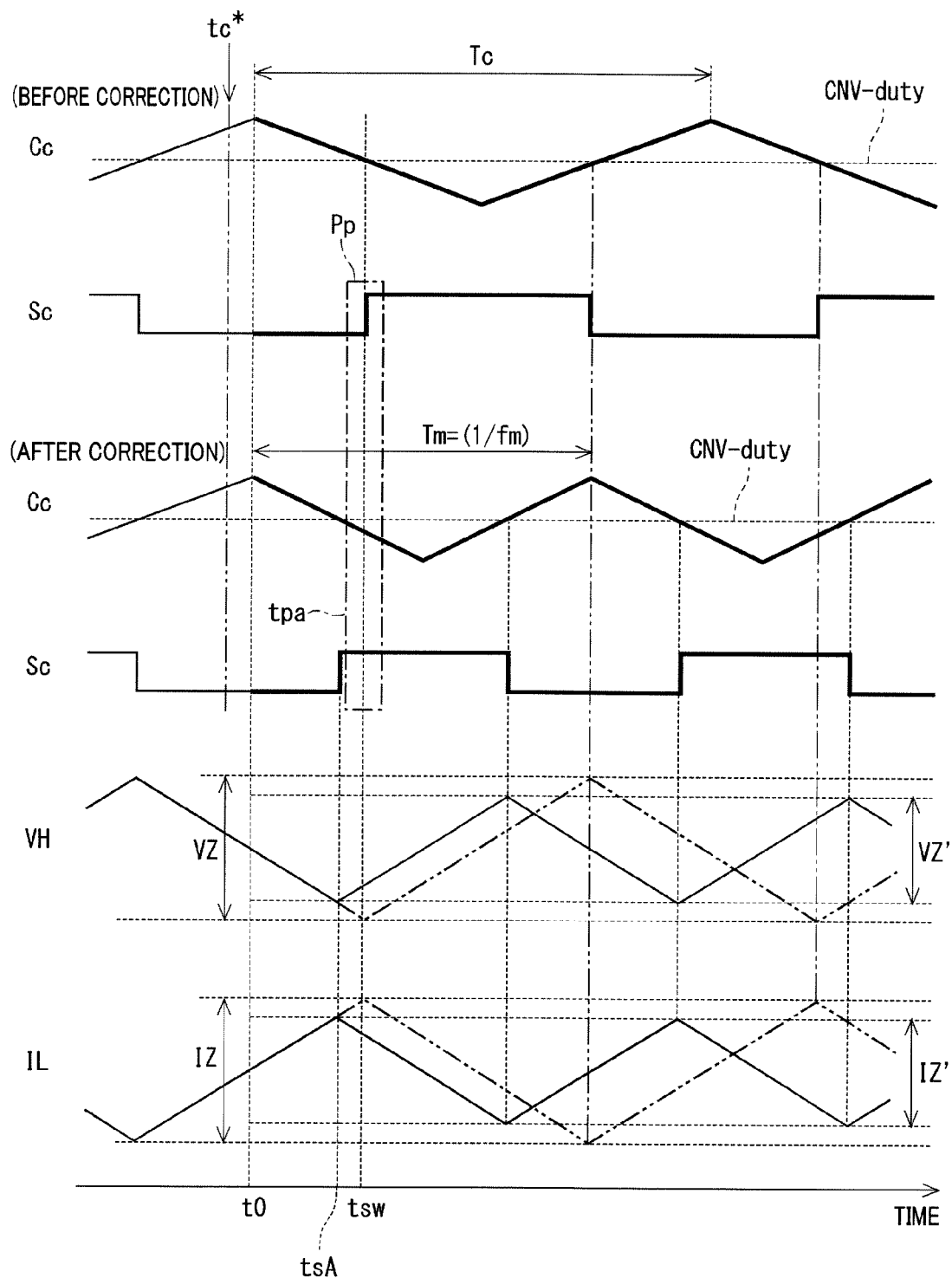
FIG. 28 is a view showing a timing chart of the carrier period change process performed by the switching control device according to the eighth exemplary embodiment of the present invention.
Figure 29A:
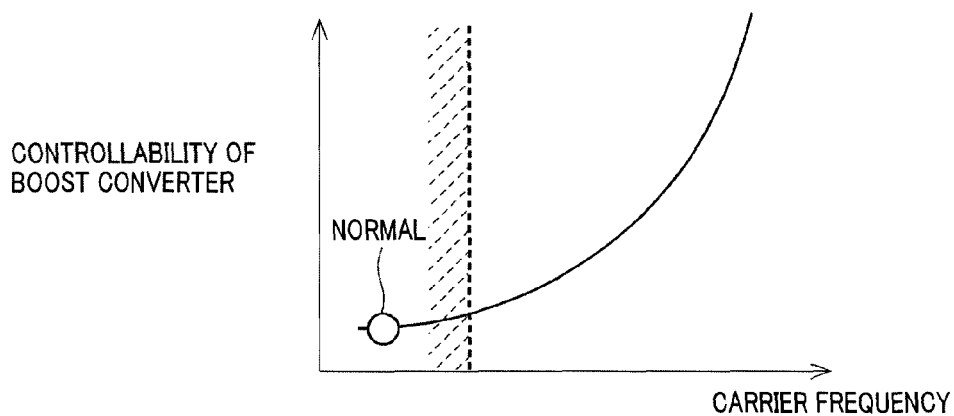
FIG. 29A, FIG. 29B and FIG. 29C are views showing maps used by the eighth exemplary embodiment of the present invention to determine a target value with which the carrier period is changed.
Figure 29B:
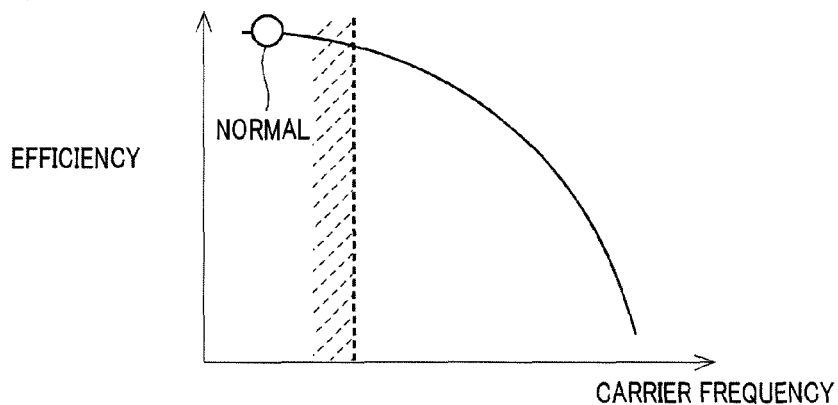
Figure 29C:
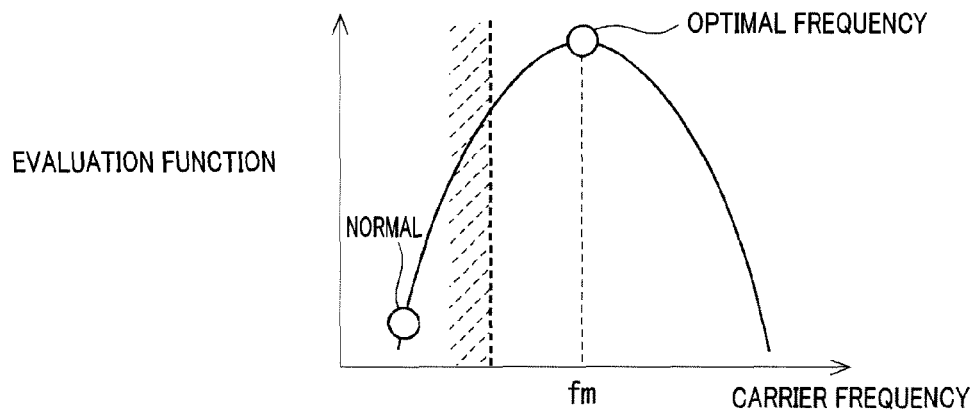

A description will be given of the carrier period change process performed by the switching control device according to the eighth exemplary embodiment with reference to FIG. 28, FIG. 29A, FIG. 29B and FIG. 29C. FIG. 28 shows a timing chart, and FIG. 29A, FIG. 29B and FIG. 29C show maps. The switching timing correction process performed by the switching control device according to the fourth to sixth exemplary embodiments corrects the switching timing tsw of the correction target by changing the duty. The seventh and eighth exemplary embodiments correct the switching timing tsw of the correction target by changing the period Tc of the converter carrier Cc.

The switching control device according to the eighth exemplary embodiment does not correct the carrier period in consideration of the relationship between the switching inhibition period Pp and the switching timings tsA and tsB which is present before and after the switching inhibition period Pp, like the seventh exemplary embodiment. The switching control device according to the eighth exemplary embodiment evaluates the carrier period independently, and changes the carrier period to its optimal value.

In the example shown in FIG. 28, the switching inhibition period Pp is calculated during the period from the process reference timing t0 following the correction process start timing tc* to the next carrier turning point.

After the process reference timing to, because the carrier period T before correction is reduced to the carrier period Tm after correction, the switching timing tsw of the correction target is corrected to the timing tsA which is before the start timing tpa during the switching inhibition period Pp.

A description will now be given of the change of the output voltage VH and the reactor current IL of the reactor 21 caused by the correction previously described.

For example, the reactor current IL has a constant slope (see FIG. 17) regardless of the carrier period when the inductance LL, input voltage Vin and output voltage VH of the reactor 21 are constant values. For this reason, the range of the reactor current IL from the maximum value to the minimum value is reduced from IL to IZ' due to the reduction of the carrier period. That is, ripple of the reactor current IL flowing from the boost converter 20 to the inverter 30 is decreased. Similarly, because the range of the output voltage VH is reduced from VZ to VZ', and ripple of the output voltage VH is also reduced.

A description will be given of the carrier frequency fm which is the inverse of the carrier period Tm after correction with reference to FIG. 29A, FIG. 29B and FIG. 29C in which the horizontal axis indicates a common carrier frequency. The vertical axis in FIG. 29A indicates the controllability of the boost converter, and the vertical axis in FIG. 29B indicates an efficiency. The vertical axis in FIG. 29C indicates an evaluation function. The evaluation function is obtained by adding the controllability and the efficiency of the boost converter by using a predetermined equation.

The higher the carrier frequency is, the more the controllability of the boost converter exponentially increases. For this reason, the evaluation function has a V-shape in which it has the maximum value at an optimal frequency at the intermediate of the carrier frequency.

In the usual control, because the efficiency of the boost converter is the important factor rather than its controllability, the carrier frequency in a low frequency range having a high efficiency is used. However, because it is necessary to consider both the controllability and efficiency of the boost converter in order to avoid generation of superimposed surge, it is necessary to use the optimal frequency fm of the evaluation function. Accordingly, it is possible for the switching control device according to the seventh exemplary embodiment to avoid generation of superimposed surge and maintain both the controllability and efficiency of the boost converter by changing the carrier frequency T to the carrier frequency Tm which is the inverse of the optimal frequency fm.

Embodiment Containing Correction of Switching Timing of Inverter

Ninth Exemplary Embodiment

Figure 30:
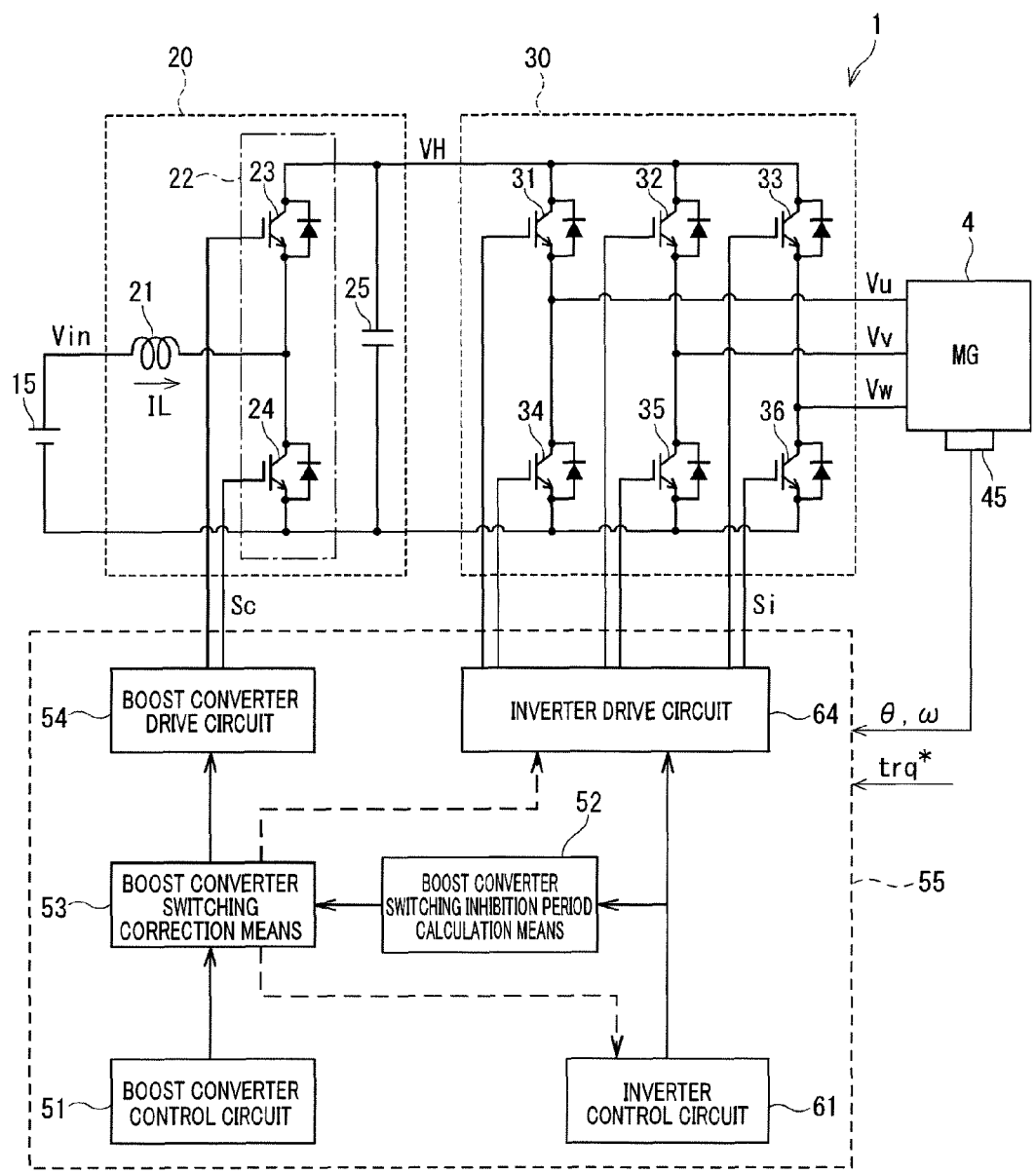
FIG. 30 is a view showing an overall structure of a motor generator drive system to which the switching control device according to a ninth exemplary embodiment of the present invention is applied.
Figure 31:
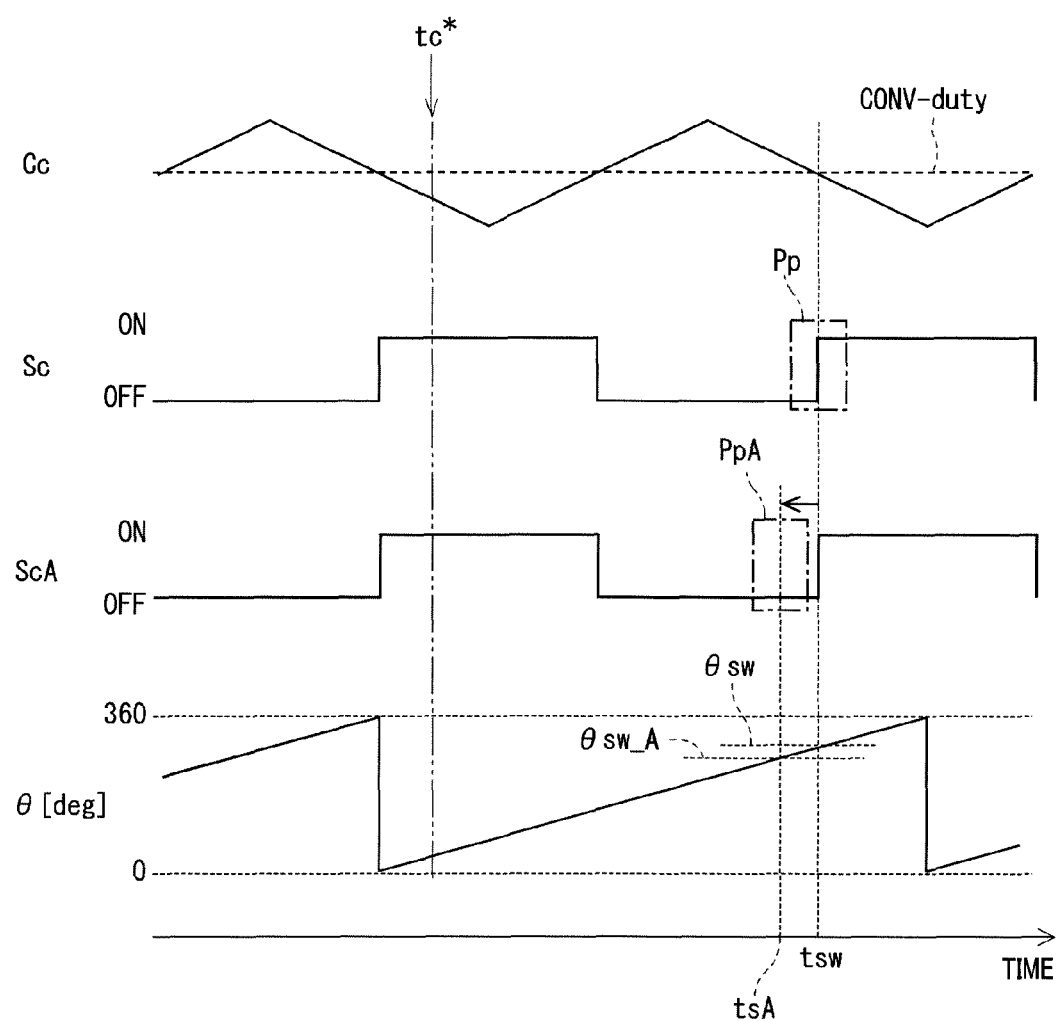
FIG. 31 is a view showing a timing chart of the switching timing correction process performed by the switching control device according to the ninth exemplary embodiment of the present invention.
Figure 32:
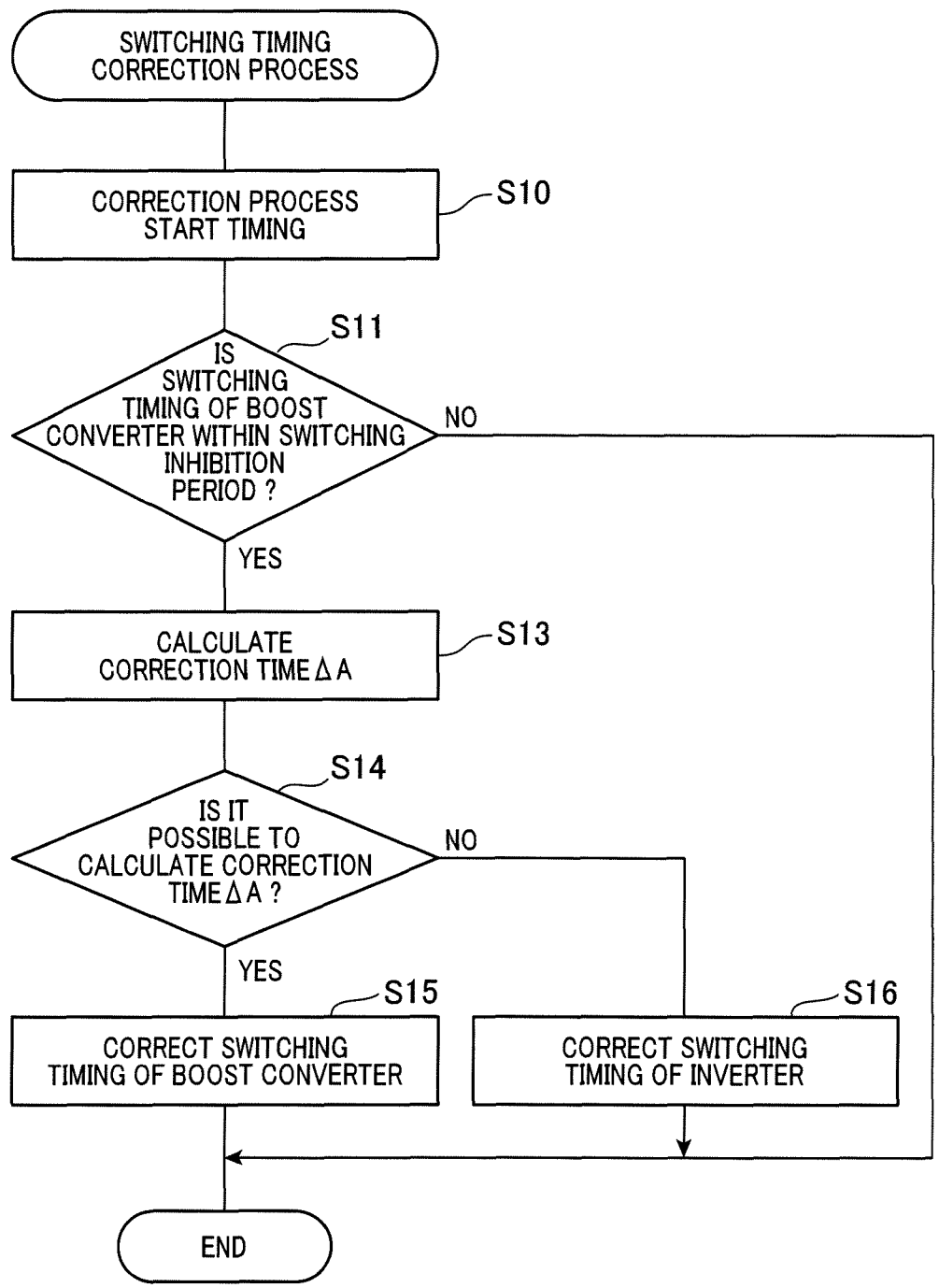
FIG. 32 is a view showing a timing chart of the switching timing correction process performed by the switching control device according to the ninth exemplary embodiment of the present invention.

A description will be given of the switching timing correction process performed by the switching control device according to the ninth exemplary embodiment with reference to FIG. 30, FIG. 31, and FIG. 32. FIG. 30 shows an overall structure of the switching control device. FIG. 31 shows a timing chart, and FIG. 32 show a flow chart.

In addition to the structure of the switching control device 50 shown in FIG. 1, the switching control device 55 according to the eighth exemplary embodiment shown in FIG. 30 further has an additional signal transmission line connected between the boost converter switching correction means 53 to the inverter control circuit 61, and an additional signal transmission line connected between the boost converter switching correction means 53 to the inverter drive circuit 64.

In the switching timing correction process performed by the switching control device 55 according to the exemplary embodiments of the present invention previously described, the switching timing tsw of the correction target is adjusted to a timing before the start timing of the switching inhibition period Pp in order to avoid generation of superimposed surge when it is predicted that the switching timing of the boost converter becomes within the switching inhibition period Pp.

However, it is not always possible for the switching control device according to the fourth and fifth exemplary embodiments to calculate the correction time ΔA under all of the states of the boost converter 20 and the inverter 30. For example, there is a possible case in which a denominator of the equation to calculate the correction time ΔA becomes zero. This makes it impossible to calculate the correction time ΔA. It is impossible for any correction to avoid generation of superimposed surge when the calculated correction time ΔA is within the switching inhibition period Pp.

It is possible to avoid generation of superimposed surge by performing an irregular process of correcting the switching timing of the inverter when it is impossible to calculate the correction time ΔA of the switching timing of the boost converter.

In the example shown in FIG. 31, when the boost converter switching correction means 53 transmits, to the inverter control circuit 61, information which indicates that the next switching timing tsw of the boost converter becomes overlapped with the switching inhibition period Pp, the inverter control circuit 61 changes the switching electrical angle θsw to the electrical angle θsw_A. This makes it possible to bring forward the switching timing tsw to the switching timing tsA, and brings forward the switching inhibition period Pp to a switching inhibition period PpA. As a result, the switching timing tsw of the boost converter becomes present after the switching inhibition period PpA, and this avoids generation of superimposed surge.

Next, a description will now be given of the process with reference to FIG. 32.

After the correction process starts at the correction process start timing tc* (in step S10), a prediction is made as to whether the switching timing of the boost converter is within the converter switching inhibition period Pp in step S11. When the judgment result in step S11 indicates YES, the correction time ΔA is calculated in step S12.

The process in step S10 and the process in step S11 shown in FIG. 32 are substantially equal to the process in step S10 and the process in step S11 shown in FIG. 12, etc. In step S13 shown in FIG. 32, the correction time ΔA is calculated by using the processes S13A to S13D shown in FIGS. 12, 14, 16 and 19, or using another equation.

In step S14, it is judged whether it is possible to calculate the correction time ΔA. When the judgment result indicates that it is possible to calculate the correction time ΔA (step S14: YES), the switching timing tsw of the boost converter is corrected to be before the start timing tpa of the converter switching inhibition period Pp by the switching timing correction process performed by the switching control device according to the fourth, fifth exemplary embodiments in step S15.

On the other hand, it is judged in step S14 that it is impossible to calculate the correction time ΔA (step S14: NO), the switching timing of the inverter is corrected in step S16 to move the converter switching inhibition period Pp in order to avoid the converter switching inhibition period Pp and the switching timing tsw of the boost converter from being overlapped with each other.

It is possible for the switching control device according to the ninth exemplary embodiment previously described to irregularly correct the switching timing of the inverter when it is impossible to correct the switching timing of the correction target in the boost converter. This makes it possible to avoid generation of superimposed surge under the overall possible states (Other Modifications)

(i) The present invention is not limited by the boost converter as the direct current voltage converter capable of boosting an input voltage. It is possible to apply the concept of the present invention to a step-down converter of reducing an input voltage. In addition, it is sufficient for the boost converter to have at least one switching element, instead of the pair of switching elements in an upper arm and a bottom arm.

(ii) It is acceptable to use, as the power conversion device according to the present invention, a H bridge circuit capable of converting a direct current power to an alternating current power usable with a direct current electric motor, in addition to the inverter converter capable of converting a direct current voltage to an alternating current voltage. Further, it is possible for the inverter to have multiple phases of not less than four, instead of three phases.

(iii) In each of the exemplary embodiments previously described, the boost converter control circuit 51 and the inverter control circuit 61 calculate the duty of the switching element as the control value of the boost converter 20 and the control value of the inverter 30, respectively. Further, the boost converter drive circuit 54 and the inverter drive circuit 64 generate the PWM signal on the basis of the comparison results between the duty and the carrier, and performs the PWM control.

However, the concept of the present invention is not limited by those methods. It is possible for another switching control device to use the judgment results of the switching timing correction method according to the present invention as long as this switching control device to adjust the switching timing of turned-on/off of the switching element.

In addition, it is acceptable for the carrier to have a saw tooth wave instead of a triangle wave.

(iv) It is possible to use devices using a high voltage such as a discharge tube, a X ray generation apparatus in addition to the electric rotary machine such as motor generators as the load to be driven by the electric power supplied from the electric power converter.

(v) It is possible for the concept of the present invention to apply an electric rotary machine as a load to be used as an auxiliary engine of vehicles, electric trains other than vehicles, elevators, and general machines. It is possible to apply the switching control device according to the present invention to various systems having a problem of generating at least a superimposed surge voltage.

As previously described, the switching control device according to the present invention can be applied to various embodiments within the scope of the present invention.

What is claimed is:

1. A switching control device, usable with a load drive system equipped with a direct current voltage converter and an electric power converter, the switching control device being capable of controlling a switching timing of switching elements in switching element pairs of the direct current voltage converter and the electric power converter, wherein the direct current voltage converter has a reactor and at least a switching element connected to the reactor, the reactor is capable of charging and discharging electric energy, an input voltage to be supplied to the reactor from a direct current power source is converted to an output voltage by turning on and off the switching elements, and the electric power converter has a plurality of switching element pairs, each switching element pair comprises a switching element at a high voltage side and a switching element at a low voltage side, the switching elements are alternately turned on and off to convert the direct current power output from the direct current voltage converter to an alternating current power, and the alternating current power is supplied to a load, wherein the switching control device comprises:

a direct current voltage converter control circuit capable of calculating a control value of the direct current voltage converter on the basis of an instruction voltage for the output voltage of the direct current voltage converter;

a direct current voltage converter drive circuit capable of driving the switching elements of the direct current voltage converter on the basis of the control value of the direct current voltage converter calculated by the direct current voltage converter control circuit;

an electric power converter control circuit capable of calculating a control value of the electric power converter on the basis of a requested output of the load;

an electric power converter drive circuit capable of driving the switching element pairs of the electric power converter on the basis of the control value of the electric power converter calculated by the electric power converter control circuit;

a direct current voltage converter switching inhibition period calculation means capable of performing a direct current voltage converter switching inhibition period calculation process which calculates a direct current converter switching inhibition period Pp, the direct current converter switching inhibition period Pp indicating a period of inhibiting the switching of the switching elements of the direct current voltage converter during a predetermined period which is in synchronization with an electric power converter switching timing prior to this electric power converter switching timing as a switching timing of at least a pair of the switching elements forming the electric power converter, and the electric power converter switching timing indicating a switching timing on a time axis, and further indicating a switching electrical angle on an electrical angle axis when an electric rotary machine is the load; and a direct current voltage converter switching correction means capable of performing a switching timing correction process of correcting the switching timing of a correction target to a timing prior to a start timing of the direct current voltage converter switching inhibition period, wherein a direct current voltage converter switching timing is a switching timing of the correction target when it is predicted for the direct current voltage converter switching timing as the switching timing of at least the switching element in the direct current voltage converter to be within the direct current voltage converter switching inhibition period.

2. The switching control device according to claim 1, wherein the direct current voltage converter switching correction means acquires an output voltage of the direct current voltage converter, an instruction voltage to be required as the output voltage of the direct current voltage converter, and an instruction voltage after correction which is smaller than a maximal value of the output voltage of the direct current voltage converter before correction, and the direct current voltage converter switching correction means corrects the switching timing of the correction target in order for the switching timing of the correction target to approach a start timing of the direct current voltage converter switching inhibition period so that the output voltage of the direct current voltage converter becomes equal to the instruction voltage after correction.

3. The switching control device according to claim 1, wherein the direct current voltage converter switching correction means acquires an estimated value of the reactor current estimated on the basis of one of the detected value of the reactor current flowing in the reactor of the direct current voltage converter and information containing a turned-on time of the switching element and a circuit constant of the direct current voltage converter, and acquires a current threshold value after correction which is smaller than a maximal value of an absolute value of the reactor current before correction, and the direct current voltage converter switching correction means corrects the switching timing of the correction target in order for the switching timing of the correction target to approach a start timing of the direct current voltage converter switching inhibition period so that the absolute value of the reactor current becomes equal to the current threshold value after correction.

4. The switching control device according to claim 1, wherein the direct current voltage converter switching correction means acquires the output voltage of the direct current voltage converter, and corrects the switching timing of the correction target to a timing which is apart from the start timing of the direct current voltage converter switching inhibition period so that the output voltage of the direct current voltage converter after correction becomes equal to a voltage threshold value.

5. The switching control device according to claim 1, wherein the direct current voltage converter switching correction means acquires an estimated value of the reactor current estimated on the basis of one of the detected value of the reactor current flowing in the reactor of the direct current voltage converter, and information containing a turned-on time of the switching element and a circuit constant of the direct current voltage converter, and the direct current voltage converter switching correction means corrects the switching timing of the correction target in order for the switching timing of the correction target to be apart from the start timing of the direct current voltage converter switching inhibition period so that the absolute value of the reactor current becomes equal to the current threshold value.

6. The switching control device according to claim 1, wherein the direct current voltage converter switching correction means further corrects a switching timing before the switching timing of the correction target, in addition to the switching timing of the correction target, in switching timings which appear during a period counted from the start timing of the switching timing correction process to the switching timing for the correction target.

7. The switching control device according to claim 6, wherein the direct current voltage converter drive circuit controls the output voltage on the basis of the direct current voltage converter on the basis of a time ratio which is a rate of the turned-on time to the turned-off time for a switching period, and the direct current voltage converter switching correction means corrects the switching timing of the correction target in order to gradually change the time ratio of the switching element.

8. The switching control device according to claim 1, wherein the direct current voltage converter drive circuit controls the output voltage of the direct current voltage converter on the basis of the time ratio which is a ratio of the turned-on time to the turned-off time for a switching period, and the direct current voltage converter switching correction means corrects the switching timing of the correction target so that the time ratio during the switching period of not less than one period becomes equal to each other before and after correction.

9. The switching control device according to claim 1, wherein the direct current voltage converter switching correction means starts the switching timing correction process immediately after the completion of the calculation process of calculating the direct current voltage converter switching inhibition period.

10. The switching control device according to claim 1, wherein the direct current voltage converter switching correction means starts the switching timing correction process so that the switching timing correction process completes at a timing immediately before the switching timing to be instructed to the direct current voltage converter drive circuit is set.

11. The switching control device according to claim 1, wherein the direct current voltage converter switching inhibition period calculation means starts to calculate the direct current voltage converter switching inhibition period at a timing when the electric power converter control circuit has calculated the electric power converter switching timing, and the direct current voltage converter switching inhibition period calculation means calculates the direct current voltage converter switching inhibition period on the basis of the electric power converter switching timing calculated by the electric power converter control circuit.

12. The switching control device according to claim 1, wherein the direct current voltage converter switching inhibition period calculation means calculates an electric power converter prediction switching timing as a next electric power converter switching timing, in addition to the calculation of the electric power converter prediction switching timing calculated by the electric power converter control circuit, and the direct current voltage converter switching inhibition period calculation means calculates the direct current voltage converter switching inhibition period on the basis of the electric power converter prediction switching timing.

13. The switching control device according to claim 1, wherein the direct current voltage converter switching inhibition period calculation means starts the direct current voltage converter switching inhibition period calculation process at the timing when the control information to control the electric power converter is updated.

14. The switching control device according to claim 1, wherein the load is an electric rotary machine, and the electric power converter prediction switching timing is defined on a switching electrical angle on an electrical angular axis of the electric rotary machine instead of using the switching timing on a time axis.

15. The switching control device according to claim 1, wherein when it is difficult to calculate the correction time for the switching timing of the correction target in the switching timing correction process, and the electric power converter switching timing is corrected to be brought forward so that the switching timing of the correction target becomes out of the direct current voltage converter switching inhibition period.

* * * * *